March 26, 1963 A. E. ENGELDER 3,082,761
APPARATUS FOR DETERMINING METABOLIC RATES
Filed Sept. 3, 1954 6 Sheets-Sheet 1
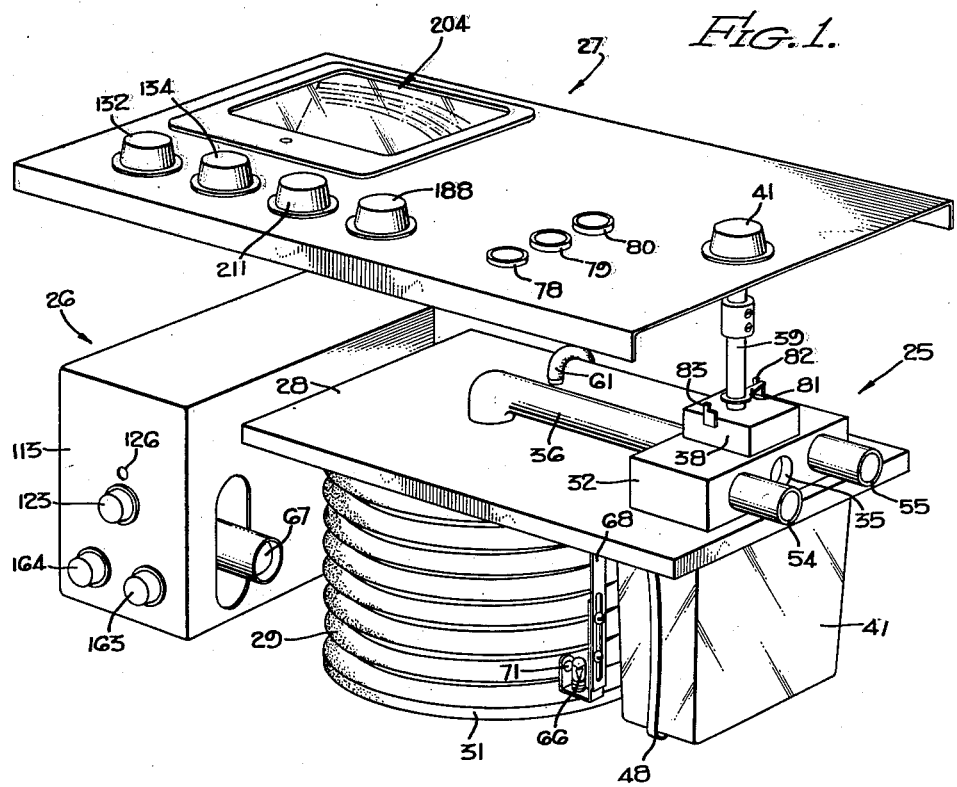
FIG. 1.
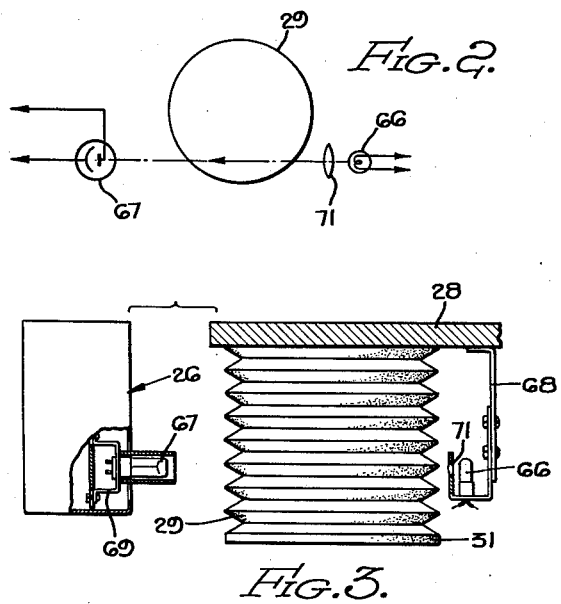
FIG. 3.
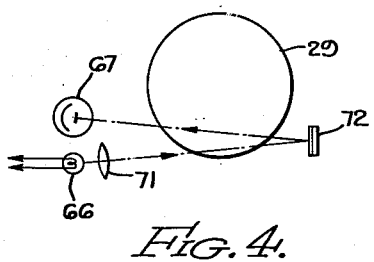
FIG. 2.
FIG. 4.
ARTHUR E. ENGELDER,
INVENTOR.
BY
ATTORNEY

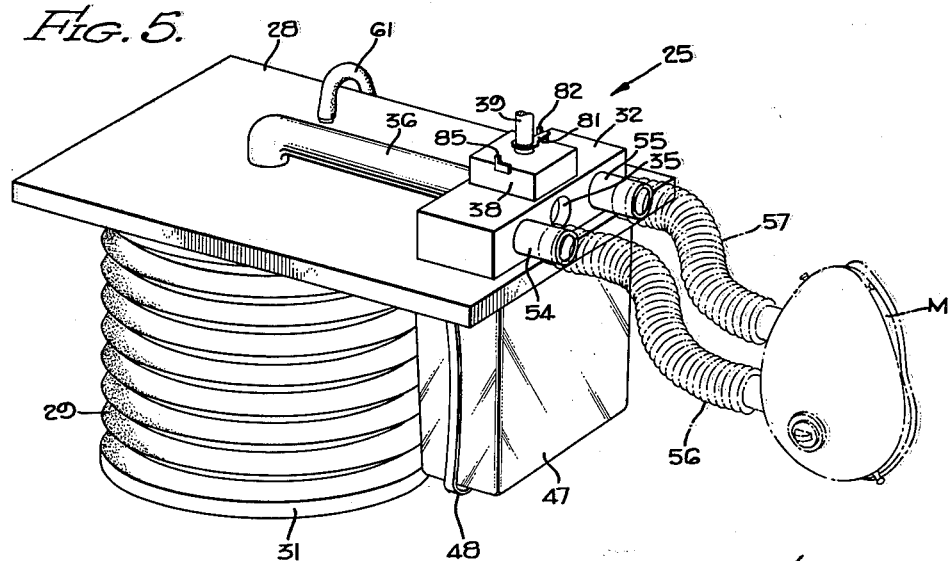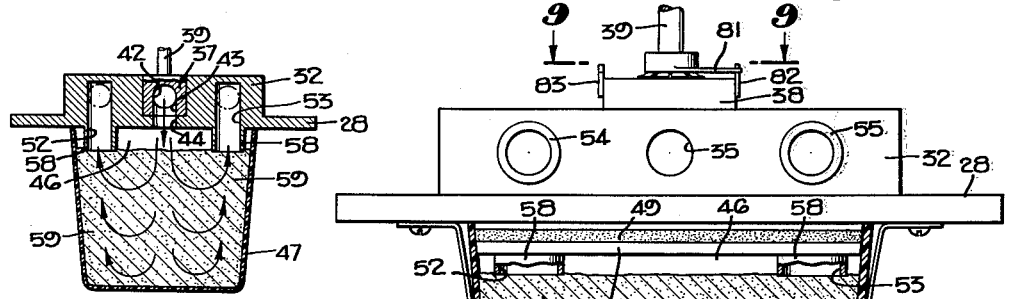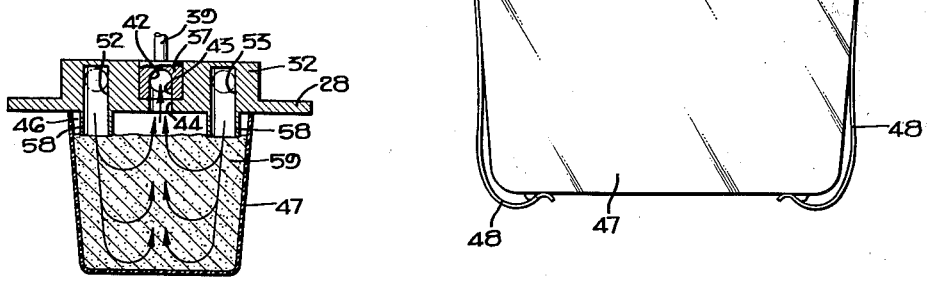

March 26, 1963 A. E. ENGELDER 3,082,761
APPARATUS FOR DETERMINING METABOLIC RATES
Filed Sept. 3, 1954 6 Sheets-Sheet 3

ARTHUR E. ENGELDER,
INVENTOR.

BY
ATTORNEYS

March 26, 1963   A. E. ENGELDER   3,082,761
APPARATUS FOR DETERMINING METABOLIC RATES
Filed Sept. 3, 1954   6 Sheets-Sheet 4

ARTHUR E. ENGELDER,
INVENTOR.

BY
ATTORNEY

March 26, 1963 A. E. ENGELDER 3,082,761
APPARATUS FOR DETERMINING METABOLIC RATES
Filed Sept. 3, 1954 6 Sheets-Sheet 5

ARTHUR E. ENGELDER,
INVENTOR.

BY
ATTORNEY

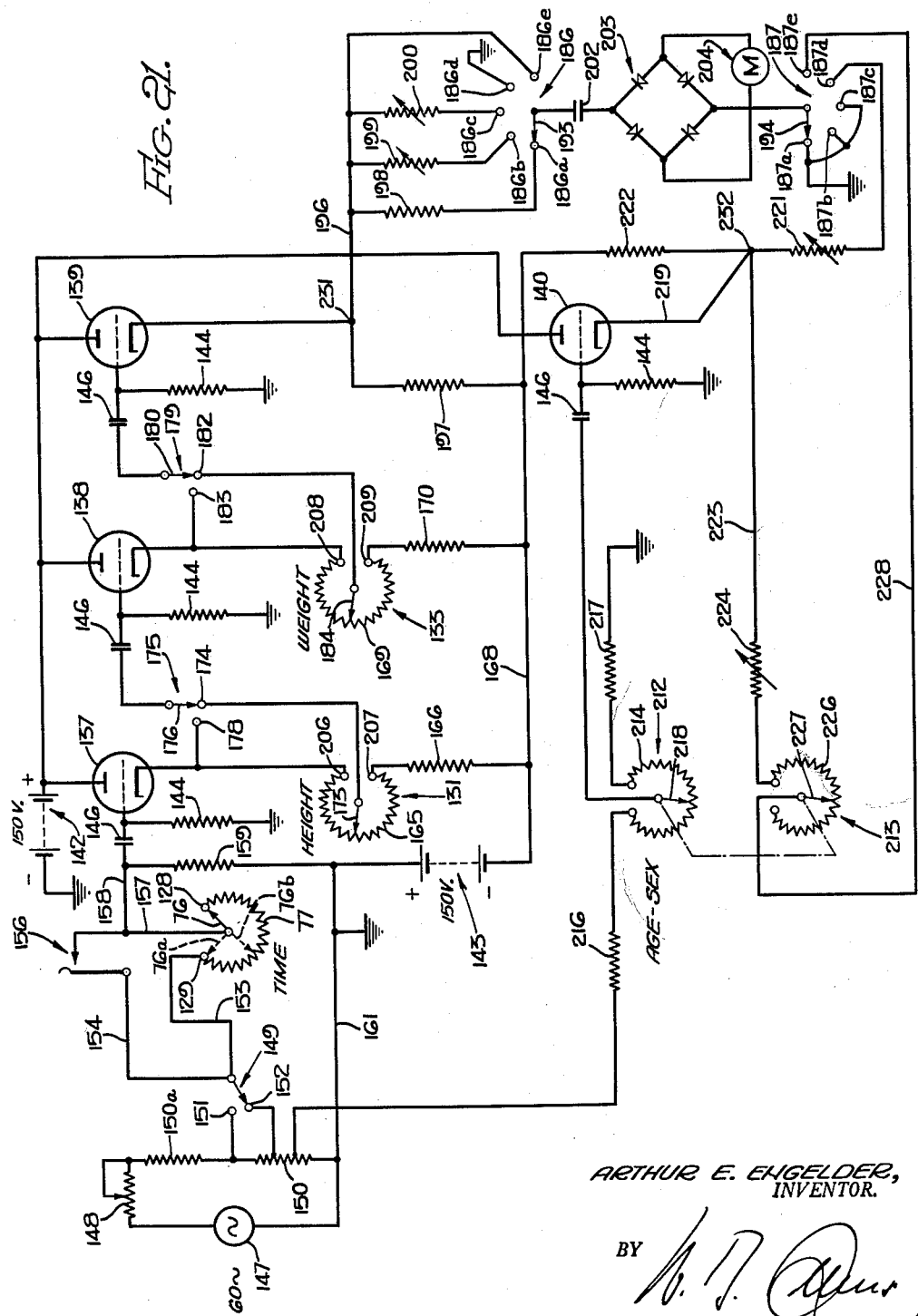

United States Patent Office 3,082,761
Patented Mar. 26, 1963

3,082,761
APPARATUS FOR DETERMINING
METABOLIC RATES
Arthur E. Engelder, Douglas, Ariz.
(1285 Manchester Drive, Santa Clara, Calif.)
Filed Sept. 3, 1954, Ser. No. 454,092
34 Claims. (Cl. 128—2.07)

This invention relates to an apparatus for determining metabolic rates, and more particularly to an improved apparatus by which a physician may determine the metabolic rate of a test subject without resort to tables, graphs or calculations of any kind. The present application constitutes a continuation-in-part of my co-pending application Serial No. 348,259, filed April 13, 1953, for an Apparatus for Determining Metabolic Rates, and now Patent No. 2,792,828. The application also constitutes a continuation-in-part of my co-pending application Serial No. 362,360, filed June 17, 1953, for a Breathing Reservoir, and now Patent No. 2,704,540.

In my co-pending application Serial No. 348,259 there was shown and described the basic instrument for determining metabolic rates through the use of computer means, so that the person operating the instrument need not perform the difficult, and frequently inaccurate, calculating steps which had previously been necessary. However, and as in the case of all first models in a new field, this previous metabolic rate instrument was subject to certain deficiencies, particularly with relation to the following important factors. A first such factor was that in the system of cascaded potentiometers, forming the analog computer circuits of the instrument, it was necessary to make the first of the potentiometers of low resistance and to make each successive potentiometer a number of times the resistance of the preceding one in order to minimize loading error or interaction. The theory behind this loading error or interaction is set forth in detail in my previous application Serial No. 348,259, and results, after a certain number of stages, in potentiometers which have undesirably high resistance. A second important factor in which the previous metabolic rate apparatus was deficient was that the indicating meter did not read directly in terms of percent deviation between the metabolic rate of the test subject and the metabolic rate of a "standard" subject of the same age and sex. Stated otherwise, although the previous instrument read the deviation between the test reading and the standard reading for the same age and sex, it was necessary to perform manually a division function in order to obtain percent deviation, the latter being necessary to a complete determination of the subject's metabolism.

The metabolic instrument disclosed in application Serial No. 348,259 made use of an inverse overall transfer function for the analog computer circuit, so that the output voltage decreased with an increase in metabolic rate and vice versa. This inverse relationship, making it necessary to calibrate the voltage responsive output meter with a reverse scale, was heretofore considered desirable since the time factor could then be entered into the analog computer circuit directly instead of as a reciprocal. Such direct entry of the time factor, by which is meant the time required by a test subject to consume a given amount of oxygen, was previously thought to be necessary from a practical standpoint, particularly in order to take care of situations where the metabolic rate of the test subject is so high that he consumes oxygen very rapidly. A simple and practical means for entering the time factor into the computer as a reciprocal, and which is operative and accurate in situations where oxygen consumption is rapid, has long been sought. This is because the reciprocal entering of time permits use of a direct overall computer transfer function and a direct instead of reverse scale on the meter, and the automatic determination of percent deviation is much more simple and economical in direct transfer function circuits.

With relation to my co-pending application Serial No. 362,360 for the Breathing Reservoir, and also to the earlier form of breathing reservoir which was described in my co-pending application Serial No. 348,259, these structures and their associated timer means were also subject to certain deficiencies, particularly with relation to the resistance or inertia which the bellows portion of the reservoir offered to the breathing of the test subject. Thus, although the provision of the dependent type bellows as set forth in application 362,360 constituted a very great improvement over the conventional bellows set forth in application 348,259, in each instance the movable bellows wall was weighted down by certain bearing and switching apparatus having the undesirable effect of increasing the bellows inertia. This inertia, or resistance to breathing is extremely important and must be minimized in order that the test subject will breathe naturally and will not gasp or choke, thereby invalidating the test. Bellows or breathing inertia is also important with relation to the canister means provided to remove carbon dioxide and water vapor from the system. Thus, the previous canister means incorporated a set of one-way flap valves offering resistance to breathing which, although slight, had an adverse effect on the general comfort and mental attitude of the subject.

In view of the above factors characteristic of previous instruments for determining the metabolic rate of a test subject, it is an object of the present invention to provide an improved metabolic rate apparatus embodying a simple and economical analog computer circuit operative to indicate all of the required readings, including percent deviation, directly and without computation of any sort, and embodying a gas unit which presents the very minimum of inertia to the breathing of the test subject.

A further object of the invention is to provide a metabolic rate apparatus including means for preventing interaction or loading error between the various stages of the analog computer circuit, so that it is unnecessary to make the resistance of each cascaded stage a multiple of the resistance of the preceding stage.

A further object of the invention is to provide a computing metabolism instrument incorporating timing means adapted to enter the time factor, or rate at which the test subject consumes oxygen, as a reciprocal function instead of a direct function, and in a highly simple manner which does not require the use of special equipment.

An additional object of the invention is to provide means for entering the time factor into the analog computer circuit as a reciprocal function, and means for increasing the amount of oxygen in the breathing reservoir after starting of the test, the increased amount of oxygen and the analog computer circuit being correlated so that the metabolic rate reading is accurate despite the fact that the oxygen was increased after test starting.

A further object of the invention is to provide a metabolic rate instrument incorporating a simple and economical means for giving a direct reading of the percent deviation between the subject's metabolic rate and the standard metabolic rate of a person of the same age and sex.

An additional object of the invention is to provide a breathing reservoir and timing apparatus in which the bellows is entirely unencumbered by switching or bearing means in order that the breathing resistance or inertia will be reduced to a very minimum, photoelectric means being provided in place of mechanical switching means for indicating the end of the test.

Another object of the invention is to provide a novel canister and manifold arrangement between the bellows and the face mask into which the test subject breathes, the arrangement being such that the canister effectively removes all carbon dioxide and water vapor from the breathing circuit without the necessity of incorporating one-way valve means such as would increase the resistance to breathing.

An additional object of the invention is to provide a manually reset combination timer and potentiometer unit, the unit incorporating a slip clutch means so constructed and mounted that no adverse effect on the potentiometer results due to presence of the slip clutch means.

These and other objects and advantages of the invention will be more fully set forth in the following specification and claims considered in connection with the attached drawings to which they relate.

In the drawings:

FIGURE 1 is a schematic exploded pictorial view showing the general relationship between the various components of the computing metabolism instrument which forms the present invention;

FIGURE 2 is a schematic plan view illustrating the photoelectric means which cooperate with the breathing reservoir or bellows to indicate the end of test;

FIGURE 3 is a schematic side elevation of the bellows and photoelectric means, indicating the mountings by which the phototube and cooperating exciter lamp may be vertically adjusted at the factory;

FIGURE 4 is a schematic diagram corresponding generally to FIGURE 2 but illustrating a modified form in which a mirror is used to reflect the light between an exciter lamp and a photocell located adjacent thereto;

FIGURE 5 is a pictorial view showing the gas unit, comprising the breathing reservoir or bellows and the canister, manifold and connected face mask, separated from the photoelectric and computing means shown in FIGURE 1;

FIGURE 6 is an end elevational view of the structure shown in FIGURE 5, the face mask and connecting tubes being omitted, and portions of the canister and manifold being broken away;

FIGURE 7 is a cross sectional schematic view of the canister and manifold, showing the paths of the air currents during inhalation by the test subject;

Figure 9:
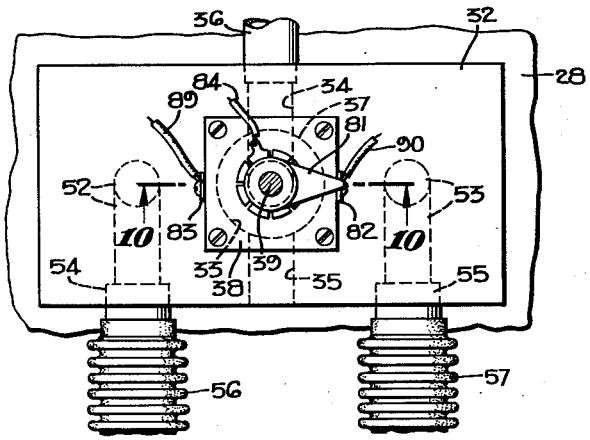
Figure 10:
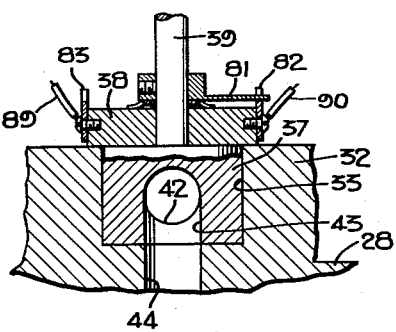
Figure 11:
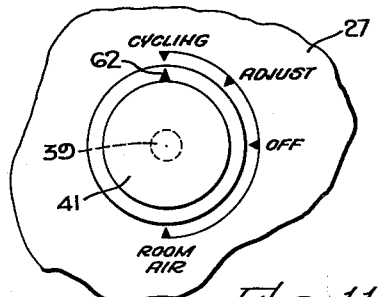
Figure 16:
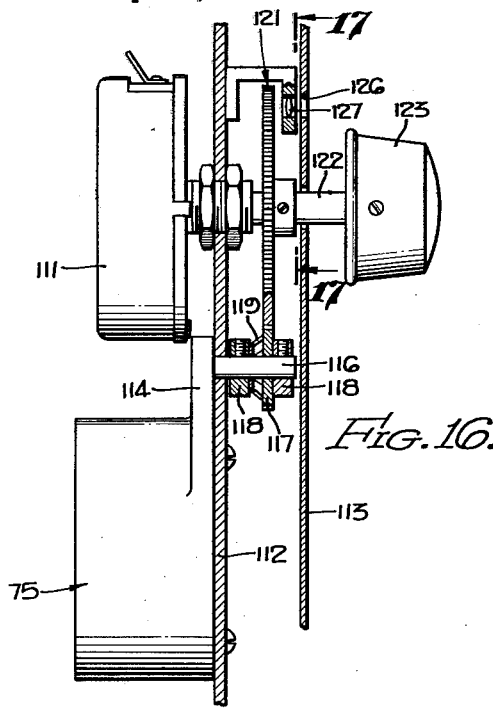
Figure 17:
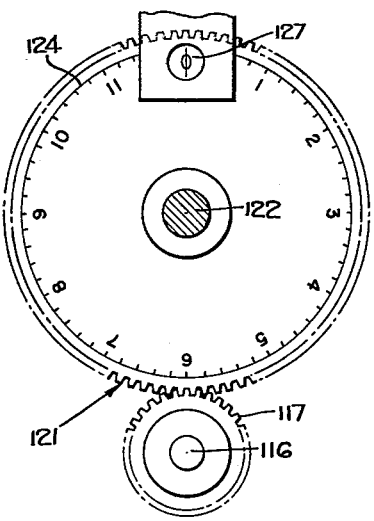
Figure 18:
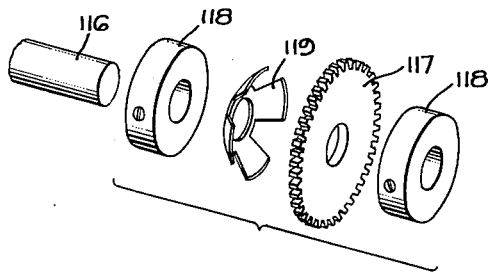
Figure 20:
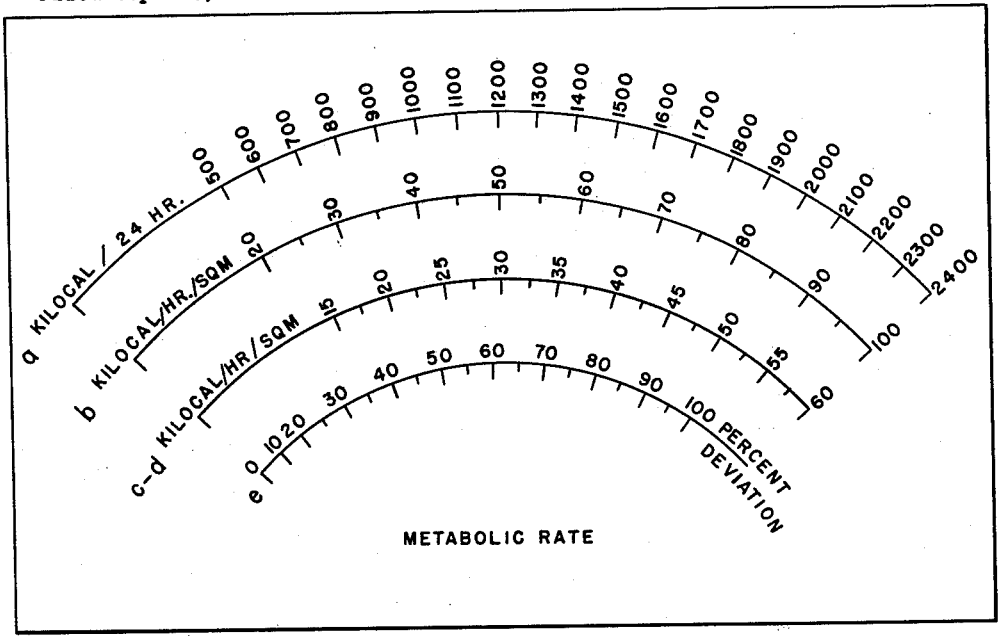
Figure 19:
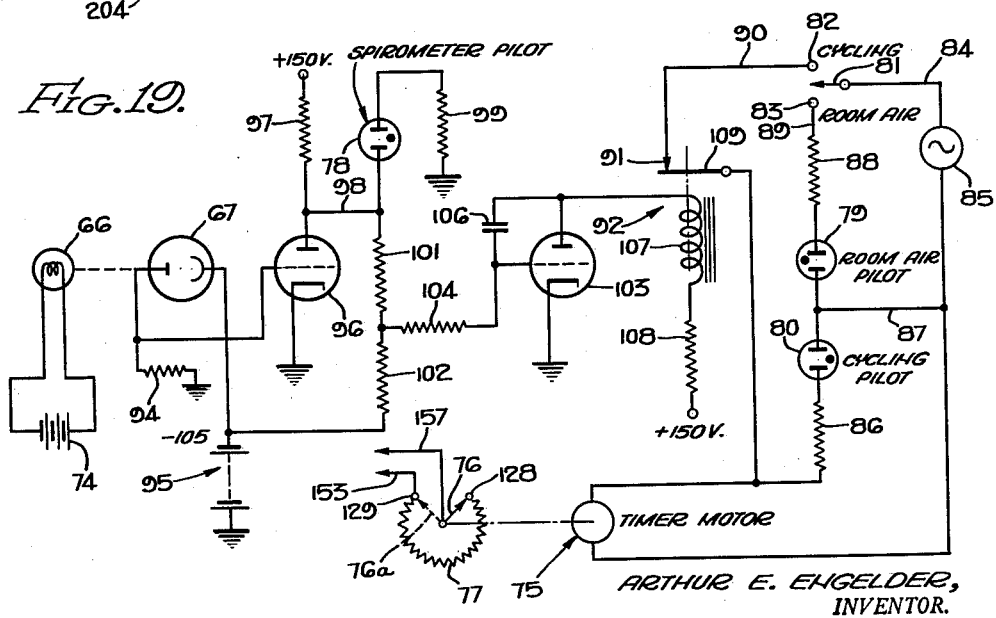

FIGURE 8 corresponds to FIGURE 7 but shows the breath paths during exhalation;

FIGURE 9 is an enlarged horizontal fragmentary sectional view taken along line 9—9 of FIGURE 6 and showing the control valve turned to the "cycling" position, at which the face mask on the test subject is in communication with the bellows;

FIGURE 10 is an enlarged fragmentary vertical sectional view taken along line 10—10 of FIGURE 9;

FIGURE 11 illustrates the position markings provided on the top panel (FIGURE 1) to indicate the four positions of the control valve;

FIGURES 12-15 are fragmentary horizontal sectional views of the control valve and illustrating, respectively, the "cycling," "adjust," "off" and "room air" positions indicated on FIGURE 11;

FIGURE 16 is an enlarged fragmentary sectional view showing the timing motor and potentiometer and the associated gear and reset means;

FIGURE 17 is an enlarged sectional view taken along line 17—17 of FIGURE 16, illustrating the time scale and zero index means for the timing motor and potentiometer;

FIGURE 18 is an exploded pictorial view of the friction clutch illustrated in FIGURE 16;

FIGURE 19 is a wiring diagram of the photoelectric timing means, incorporating time delay means for preventing stopping of the timer motor until the lower bellows wall is at or above a predetermined reference elevation for a predetermined period of time;

FIGURE 20 illustrates the face of the meter shown in FIGURE 1; and

FIGURE 21 is a wiring diagram of the electronic analog computer circuit associated with the timing circuit shown in FIGURE 19.

Referring now to the drawings and particularly to FIGURE 1, the apparatus may be seen to comprise generally a gas or spirometer unit 25, a computer unit 26, and a top or control panel 27 which serves as a mounting for control, pilot and meter elements associated with the computer unit 26 through electrical connectors, not shown. It is to be understood that the showing of FIGURE 1 is schematic only, and that in actual production the various electronic equipment in computer unit 26 may be mounted in the same general casing as gas unit 25 and not in a separate box as illustrated. Furthermore, the construction may be such that the gas unit 25, and its associated photoelectric and timer means to be described subsequently, are assembled and sold independently of the computing portions of the instrument. Thus, the instrument may either be sold as a unitary computing metabolism apparatus, or it may be sold with the computing elements separate from the gas unit 25 and associated timing means.

Proceeding first to a description of the gas unit 25, and referring specifically to FIGURE 5 which shows the gas unit separated from the photoelectric means, the computing unit and the control panel, there is illustrated a horizontally disposed support plate 28 which is held in elevated position by suitable supporting means, not shown. Mounted on support plate 28 in dependent sealed relation is a highly flexible, lightweight corrugated bellows 29 which is preferably cylindrical in shape and which has a horizontally disposed vertically movable bottom wall 31. The general principles of operation of the illustrated dependent type bellows are set forth in detail in my co-pending application 362,360 for a Breathing Reservoir, and result in a great lessening of the resistance which the bellows creates to the breathing of the test subject. However, in the apparatus illustrated in application 362,360 the bellows bottom wall was provided with electric circuit means which formed part of the timing mechanism for the unit, whereas the present bellows 29 is completely unencumbered and is provided with no switching or bearing elements of any sort. The bellows 29 may therefore be constructed with a very minimum of weight and inertia tending to resist the breathing of the subject, such construction being possible due to the photoelectric timing means to be described in detail hereinafter.

A generally rectangular manifold 32 is formed integral with the support plate 28 to one side of the bellows 29, and as best illustrated in FIGURES 6-10. The manifold 32 is formed centrally thereof with a cylindrical well 33 communicating with diametrically opposed passages 34 and 35 extending radially to the sides of the manifold. One of the passages, numbered 34, connects to a tube 36 leading to the interior of bellows 29, whereas the other passage, numbered 35, opens to the atmosphere. A cylindrical control element 37 is rotatably mounted in well 33 and is held in position by a rectangular top plate 38, there being a shaft 39 connected axially to valve element 37 and extended upwardly through the control panel 27 for rotation by a control valve knob 41 as shown in FIGURES 1 and 11.

Control valve element 37 is formed of a radial port or passage 42 adapted to register selectively with passages 34 and 35, depending upon the rotated position of the valve, the port 42 communicating with a downwardly extending axial valve passage 43 which registers with a downwardly extending passage 44 in the manifold 32. As best shown in FIGURES 6, 7 and 8, passage 44 opens into a canister chamber 46 defined by a generally rectangular canister box 47 which is depended from the underside of support plate 28 by means of spring clips 48. A suitable seal 49 (FIGURE 6) is provided on a depending flange portion 51 of plate 28 and serves to prevent leakage of air from the canister.

The canister box 47 extends tranversely for substantial distances on each side of passage 44 which communicates generally axially thereof, and passages 52 and 53 are provided in manifold 32 with their lower ends relatively adjacent the vertical canister end walls. Passages 52 and 53 communicate, respectively through fittings 54 and 55 with corrugated breathing tubes 56 and 57 (FIGURES 5 and 9) leading to a face mask M adapted to be mounted over the nose and mouth of the test subject. It is pointed out that the passages 52 and 53 are in part formed in tube portions 58 of the manifold and which extend downwardly to just beneath the level of the absorbent material 59 contained in the canister, so that air from passages 52 and 53 flows directly into the absorbent material 59 yet there is no interference to the mounting of the canister box 47 by means of the spring clips 48. The absorbent material 59 may be any suitable substance capable of absorbing carbon dioxide gas and water vapor from the system, and may consist of granular soda lime.

Figure 12:
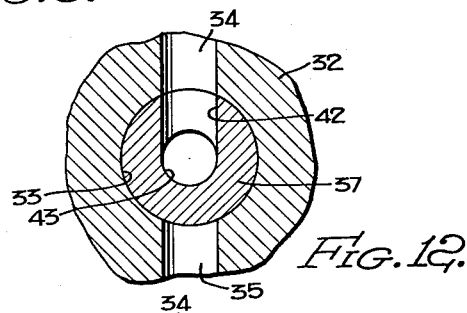

Assuming that the control valve 37 is turned to the position shown in FIGURES 9 and 12, so that bellows 29 communicates through tube 36, passage 34, port 42, and passages 43 and 44 to the canister chamber 46, the breath or air currents as the test subject inhales and exhales will follow the general U-shaped paths as indicated by the arrows in FIGURES 7 and 8. As the subject inhales, gas will be drawn from the bellows 29 and through the described passages and ports to the center of canister chamber 46, after which it will follow the arrows shown in FIGURE 7 to the respective passages 52 and 53 and thence to the tubes 56 and 57 leading to the face mask M on the subject. Conversely, as the subject exhales, air will flow through the tubes 56 and 57, and passages 52 and 53 through canister chamber 46 to passage 44 and the bellows as indicated by the arrows in FIGURE 8. Due to the relative positions of the passage 44 and the tube portions 58 defining the lower ends of passages 52 and 53, the air being exhaled and inhaled passes along curved paths through a large amount of the material 59, and a very effective absorption action is produced.

With the described canister and manifold arrangement the carbon dioxide and water vapor exhaled by the test subject are effectively absorbed, yet the resistance to breathing is at a minimum since no flutter valves are required. This is to be contrasted with previous structures in which it was believed to be necessary to incorporate suitable one-way or flutter valve means, for example in the passages 52 and 53, in order to provide an effective carbon dioxide and water vapor absorption action.

Since the carbon dioxide and water vapor exhaled by the test subject are absorbed by the material 59 in canister 47, it follows that the only gases flowing between the bellows 29 and the lungs of the subject are oxygen and inert gases such as nitrogen, the latter gases playing no part in the method for determining metabolic rates since they are not absorbed by the lungs of the subject. The oxygen breathed by the subject is initially introduced into the bellows 29 by means of a tube 61 which communicates with the bellows and with a suitable gas source such as a piercing device for releasing oxygen from an oxygen capsule, not shown. Preferably, the oxygen in the capsule has a predetermined weight which is standardized for the instrument so that it is unnecessary to compensate, in calculations of the metabolic rate, for the temperature and pressure of the ambient atmosphere and as fully set forth in my co-pending application Serial No. 348,259. Suitable piercing means is shown in my Patent No. 2,641,253, issued June 9, 1953.

In addition to the valve position shown in FIGURE 12, at which the face mask is in communication with the bellows 29 and which is known as the "cycling" position, the valve 37 has three other positions termed "off," "room air," and "adjust." These positions are marked on the control panel 27 as shown in FIGURE 11, and indicated by an index marker 62 on the control valve knob 41.

Figure 14:
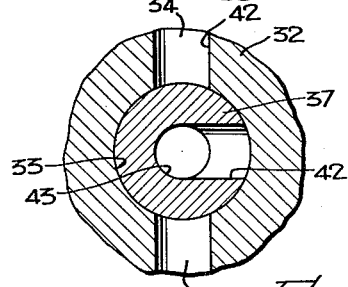

When the knob 41 is turned so that marker 62 registers with the "off" mark on panel 27, the valve is in the position shown in FIGURE 14 and its radial port 42 is blocked by the manifold wall. Upon turning of the valve to the point where index 62 registers with "room air," the valve is in the position shown in FIGURE 15 and radial port 42 registers with passage 35 leading to the atmosphere. This is the position to which the valve is turned prior to actual cycling of oxygen, so that the test subject can become accustomed to the mask and can breathe room air until he is completely relaxed and breathing regularly. Thereafter, and assuming that the bellows 29 has previously been charged with the predetermined weight of oxygen, the operator turns the knob 41 until index 62 registers with the "cycling" position shown in FIGURES 9, 11 and 12, at which port 42 registers with passage 34 to complete the circuit between the bellows and subject and as previously described. The subject then commences to breathe oxygen from the bellows and cause its bottom wall 31 to move upwardly and downwardly as air is inhaled and exhaled, but to have an overall upward movement as the oxygen is absorbed by the lungs.

Figure 13:
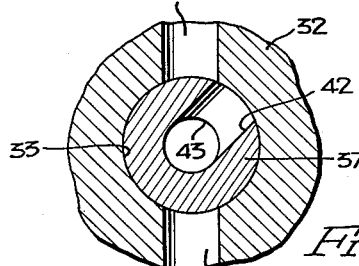
Figure 15:
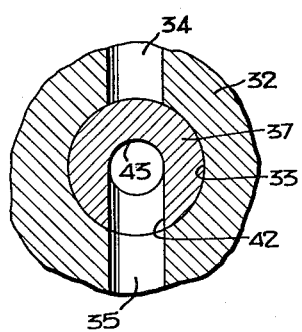

The final valve position, termed "adjust," is illustrated in FIGURE 13 as being one in which port 42 is only in partial registry with passage 34 leading to the bellows. The valve is turned to "adjust" prior to placing the face mask on the subject, and prior to charging the bellows with oxygen. Air is thus slowly admitted into the bellows to permit its bottom wall 31 to move slowly downwardly from an elevated position, to which it has previously been manually placed by pressing upwardly on wall 31 and thus exhausting air from the bellows, until the bottom wall 31 reaches a predetermined reference position at which passage of a beam of light from an exciter lamp (FIGURES 1–3) to a photocell 67 is first blocked.

As shown in FIGURES 1 and 3, the exciter lamp 66 is mounted on an adjustable bracket 68 on support plate 28, so that its elevation may be adjusted at the factory and in accordance with the characteristics of the bellows 29 and other factors. Correspondingly, photocell 67 is mounted on an adjustable bracket 69 on the opposite side of the bellows, its elevation being likewise adjustable at the factory. In the illustrated form the photocell 67 is shown as mounted in the box for the computer 26, but it is obvious that it may be mounted on a separate bracket as in the case of lamp 66. A lens 71 is provided to concentrate the light from the exciter lamp on the photocell, so that the light beam will have a well defined horizontal path permitting accurate positioning of the bottom bellows wall 31.

As an alternative to the illustrative construction in which the exciter lamp 66 and photocell 67 are disposed on opposite sides of the bellows, the arrangement of FIGURE 4 may be employed and in which a mirror 72 is utilized to reflect a beam of light from the exciter lamp to a photocell located adjacent thereto.

To briefly summarize the procedure for preparing for a test of the metabolic rate of a subject, the operator turns control valve 37 to the "adjust" position, shown in FIGURE 13, and then lifts the bottom bellows wall 31 to a point substantially above the path of the light beam from exciter lamp 66 to photocell 67. He then releases the bottom bellows wall and permits it to settle slowly downwardly under the effect of gravity, causing air to flow therein from the canister and through valve port 42 and the passage 34, until the bellows wall reaches the predetermined reference level or elevation and the light beam is barely cut off. This is indicated electrically by means of a pilot light associated with the photocell 67 and as will be described in detail subsequently in connection with the circuit shown in FIGURE 19. It is pointed out that the reference level may be the point at which the light beam is first blocked during downward movement of wall 31, or first permitted to pass to the photocell during upward movement of wall 31. These two elevations are separated by an infinitesimal distance and may be treated as the same.

As soon as the bellows wall 31 reaches the reference level, control valve 37 is turned to the "off" position shown in FIGURE 14, the wall 31 then remaining at the reference level since no further air may be admitted into the bellows. The operator then places an oxygen capsule containing a predetermined weight of oxygen into the piercing apparatus, not shown, and operates the piercing apparatus to cause oxygen to flow through the tube 61 and into the bellows 29. The bottom bellows wall 31 will then move downwardly to a level determined in part by the ambient atmospheric pressure and temperature, but this level is immaterial to the operation of the instrument. The operator then places the face mask on the subject, after turning the valve 14 to the "room air" position shown in FIGURE 15, and permits the subject to breathe room air until he is completely relaxed and breathing regularly. Thereafter, the valve is shifted to the "cycling" position shown in FIGURE 12, at which time the test subject commences to breathe up the oxygen charge so that the bottom bellows wall 31 has an overall upward movement until the light beam from lamp 66 can again pass to photocell 67, which indicates (after a time delay interval as will be described) that the oxygen charge has been consumed and the test is over. The time required by the test subject to consume the predetermined oxygen charge is an important variable in the determination of the subject's metabolic rate and is determined accurately and electrically by means of the circuit shown in FIGURE 19 and as will next be described.

FIGURE 19 shows the exciter lamp 66 connected for energization by a suitable source of voltage, represented by a battery 74, so that it will light and direct a beam of light to the phototube 67 when the light path is not obstructed by bellows 29. Other important components shown diagrammatically in FIGURE 19 include a constant speed timer motor 75, which may comprise a standard electric clock but is shown in FIGURE 19 as being mechanically connected to drive the contact arm 76 of a "time" rheostat along the winding 77 of the rheostat. Contact arm 76 and winding 77 are connected in the electrical analog computer circuit of FIGURE 21 for the purpose of inserting the time factor into that circuit as will be described hereinafter. In addition to the exciter lamp, phototube and timer, the circuit in FIGURE 19 includes three pilot lamps 78, 79 and 80, respectively termed the "spirometer" pilot, the "room air" pilot, and the "cycling" pilot. These pilots are preferably glow tubes mounted on the top panel 27 shown in FIGURE 1 and serve as a visual indication of the condition of the gas unit 25 during various portions of a metabolic rate test.

In order to correlate the timing circuit of FIGURE 19 with the position of the control valve 37, an electrically conductive contact arm 81 (FIGURES 9 and 10) is mounted on the control valve shaft 39 and adapted to engage electrically conductive combination stop and switch elements 82 and 83 when the control valve is respectively in the "cycling" and "room air" positions. Thus, when the control valve is in the position shown in FIGURES 9, 10, and 12, the contact arm 81 is in contact with element 82 and the valve is set for cycling of oxygen between bellows 29 and the subject, whereas the valve is in the "room air" position upon its rotation 180 degrees to the position shown in FIGURE 15 at which arm 81 is engaged with element 83.

As shown in FIGURE 19, the contact arm 81 on control valve shaft 39 is connected through a lead 84 to one side of a 110 volt sixty cycle alternating current source 85, the other side of source 85 being connected to one side of the constant speed timer motor 75. The other side of the timer motor 75 is connected through a current limiting resistor 86 (preferably 560 kilohms) to one side of "cycling" pilot 80. The other side of "cycling" pilot 80 is connected both to "room air" pilot 79 and, through a lead 87, to the lead connecting current source 85 to timer motor 75. The remaining terminal of the "room air" pilot 79 is connected to a resistor 88 (preferably 560 kilohms) and thence through a lead 89 to the "room air" terminal 83 of the selector switch on the control valve. The remaining or "cycling" terminal 82 on the control valve is connected through a lead 90 to the contact 91 of a normally closed relay 92, the relay being controlled by operation of the photoelectric circuit as will next be described.

In the photoelectric circuits for controlling the relay 92, and thus the various pilots and the timer motor 75 in accordance with the positions of both control valve 37 and bellows 29, the anode of phototube 67 is connected through a high (preferably 10 megohms) resistor 94 to ground, whereas the cathode of the photocell is connected to the negative terminal of a suitable direct current source 95 (preferably minus 105 volts), the other side of the source 95 being connected to ground. A first triode vacuum tube 96 is provided with its cathode connected to ground, its grid connected to a point between the anode of photocell 67 and resistor 94, and its plate connected through a resistor 97 to a source of positive voltage, preferably 150 volts. The pilot light 78 has one of its terminals connected through a lead 98 to a point between the plate of triode 96 and resistor 97, and the other of its terminals connected through a resistor 99 to ground. The resistor 99 is substantially higher than resistor 97, it having a preferred value of 560 kilohms whereas resistor 97 has a preferred value of 120 kilohms. A pair of resistors 101 and 102 are series connected between lead 98 and the lead which connects the cathode of phototube 67 to voltage source 95, the first resistor having a preferred value of 910 kilohms and the second having a preferred value of 620 kilohms.

A second triode 103 is provided with its grid connected through a high (preferably 10 megohms) resistor 104 to a point between resistors 101 and 102, the resistor 104 serving as an important element to produce a time delay effect between photocell energization and the opening of relay 92. The grid of triode 103 is also connected to a time delay capacitor 106, the other side of the capacitor 106 being connected to the plate of triode 103 and also to one terminal of the coil 107 for relay 92. The remaining terminal of coil 107 is connected through a low resistor 108 (preferably 8000 ohms) to a source of positive direct voltage, preferably 150 volts. The cathode of triode 103 is connected to ground, and the coil 107 is adapted when energized to attract the arm 109 of relay 92 away from the contact 91 with which it is normally engaged.

In the operation of the circuit shown in FIGURE 19, let it be assumed that the bottom bellows wall 31 has previously been adjusted to the reference position as described above, and that the predetermined oxygen charge has been admitted to the bellows to cause downward movement of bellows wall 31, for example to the position shown in FIGURE 3, the light beam from exciter lamp 66 then being blocked by the bellows. When the valve 37 is in the "room air" position, contact arm 81 is in engagement with switch element 83 to complete a circuit from voltage source 85 and through resistor 88 and the "room air" pilot 79 on control panel 27. The pilot 79 is thus lit, which informs the operator that the control valve is in the correct position permitting the test subject to breathe atmospheric air until he is in a completely relaxed condition.

As soon as the subject is completely relaxed, the control valve knob 41 is turned 180 degrees until valve element 37 is in the "cycling" position shown in FIGURES 9–12, which completes the previously described path between the face mask and the bellows 29. The contact arm 81 then comes into engagement with switch element 82, which breaks the circuit to "room air" pilot 79 and completes a circuit to "cycling" pilot 80 and timer motor 75. The circuit to the "cycling" pilot is from source 85 through arm 81, contact element 82, contact 91 and arm 109 of relay 92, resistor 86, pilot 80 and lead 87 back to the source 85. The circuit to the timer motor 75 is also through arm 81, contact element 82, contact 91 and arm 109, and then to timer motor 75 and back to the other side of voltage source 85. "Cycling" pilot 80 then lights to indicate to the operator that the test is in progress, and timer motor 75 commences to operate at a constant rate for automatic recording of the length of test as will next be described.

It is to be remembered that at the beginning of the test the photocell 67 is dark or de-energized since the light beam from exciter 66 is blocked by the bellows 29. When the photocell 67 is thus in a dark or de-energized condition, the grid of triode 96 will be at or near zero voltage relative to ground and full current will be flowing from the anode to the cathode thereof, thereby producing a substantial voltage drop in resistor 97 and reducing the anode voltage of triode 96 to about 50 volts, for example. This 50 volt voltage is insufficient to operate through lead 98 and "spirometer" pilot 78 to effect lighting of the latter, resistor 99 being sufficiently high to prevent lighting of pilot 78 at this time. This 50 volt voltage is also insufficient to operate through resistors 101 and 104 and overcome the negative bias impressed on the grid of triode 103 through resistors 104 and 102 from source 95, so that no current flows in triode 103 and relay 92 is deenergized. The relay 92 being de-energized, its contact arm 109 will remain in engagement with contact 91 and timing operation will be continued by timer motor 75.

As the end of the test approaches, so that the subject has almost completely absorbed the predetermined oxygen charge in bellows 29, the bottom bellows wall 31 will at the end of an upward excursion pass above the light beam from exciter lamp 66, so that photocell 67 will be momentarily energized and will conduct current until the subject again exhales to cause wall 31 to block the light beam again. The momentary conduction of current by photocell 67 has the effect, due to the presence of resistor 94, of producing a strong negative bias on the grid of triode 96, thereby cutting off the flow of current in the latter tube. As soon as current ceases to flow in triode 96 the voltage in lead 98 increases to an amount (for example approximately 130 volts) sufficient to cause lighting of "spirometer" pilot 78, so that this pilot blinks to inform the operator that the end of the test is approaching. In addition, the increased voltage in lead 98 operates through resistors 101 and 104 to tend to increase the grid bias on tube 103 to approximately zero volts relative to ground. However, the resistor 104 and capacitor 106 have the effect of preventing this increased grid voltage in triode 103 for a predetermined time interval, which is preferably approximately a normal breathing cycle of a few seconds. Accordingly, the momentary elevation of bottom bellows wall 31 above the light beam from exciter lamp 66 only operates to cause blinking of "spirometer" pilot 78, and does not cause conduction of current from the cathode to the anode of triode 103. In connection with the described time delay effect it is pointed out that the connecting of capacitor 106, as indicated, operates because of negative feedback in the circuit to magnify the effective capacitance and permit use of a relatively small capacitor.

As the test subject continues to consume the charge of oxygen, the bottom bellows wall 31 will, on its upward and downward excursions, remain above the light beam from exciter lamp 66 for increasingly long periods of time. At approximately the exact time when the predetermined oxygen charge is completely consumed, the bellows wall 31 will remain above the light beam for a period longer than the time delay interval produced by capacitor 106 and resistor 104, and to some extent by resistors 101 and 102, so that the bias on the grid of triode 103 will rise to approximately the zero value and current flow in triode 103 will result. This current flow passes through the coil 107 of relay 92 to attract relay arm 109 away from contact 91, thereby breaking the circuit from voltage source 85 to cycling pilot 80 and timer motor 75. Timer motor 75 then stops to record the exact length of time required by the test subject to consume the oxygen charge, and cycling pilot 80 is de-energized to inform the operator that the control valve 37 should be shifted to "room air" position, after which the mask M on the test subject may be removed. For a further description of the "time delay" principle for determining the end of test, reference is made to application 362,360.

It is pointed out that the spirometer pilot 78 not only serves the function of indicating to the operator that the end of the test is approaching, but is also employed in the initial adjustment of the bellows wall 31 to the reference level as described previously. Thus, the operator need only when adjusting the bellows wall to the predetermined reference level, maintain valve 37 at the "adjust" position (FIGURE 13) until the exact instant when pilot 78 is extinguished.

Although, as previously indicated, the timer motor 75 may be an electric clock which has the sole effect of recording the test interval so that the operator may compute the metabolic rate of the test subject by graphical or other methods conventionally practiced, in the preferred form of the invention the motor 75 is employed to drive the arm 76 over the winding 77 of the "time" rheostat which is employed, as illustrated in FIGURE 21, to introduce the time factor automatically into the electrical analog computer circuit. Because of the fact that the operator, through use of the analog computer circuit, may determine the metabolic rate in the matter of a few seconds after the control valve has been shifted to the "room air" position at the end of the test, he is in many cases able to tell whether or not the test has been invalidated through gasping of the test subject or other factors. If he should determine that the test does not give a plausible result, he may desire to insert another charge of oxygen and conduct another test without removing the face mask from the test subject.

Referring next to FIGURES 16–18, mechanism is illustrated for associating the timer motor 75 with the contact arm 76 of the time rheostat, the latter being mounted, together with winding 77, within a casing 111. The motor 75 and casing 111 are shown in FIGURE 16 as being mounted on a suitable bracket plate 112 spaced inwardly from the end wall 113 of the computer unit 26 shown in FIGURE 1. It is to be understood, however, that the showing of wall 113 and computer 26 are schematic only, and that motor 75 and casing 111 may be mounted on any suitable panel within the metabolic rate apparatus.

The motor 75 may be any suitable type, for example a synchronous clock motor, which operates through a gear train portion 114 to drive an output shaft 116 at a constant speed. A gear 117 is mounted on shaft 116 by means of a slip clutch comprising a pair of adjustable collars 118 and a friction washer or spring 119, the relation being such that a friction drive for gear 117 is provided. Gear 117 is meshed with a relatively large gear 121 which is fixedly mounted on the shaft 122 for contact arm 76 of the time rheostat. It follows that when the timer motor 75 drives the meshed gears 117 and 121, shaft 122 will rotate and cause sliding of contact arm 76 along winding 77, a reset knob 123 for the time rheostat being also rotated together with the shaft. The outer face of gear 121 is provided with a scale 124 calibrated relative to the respective gear ratios and timer motor speed so that the number of minutes required by the test subject to consume the test charge will be registered at a window 126 in end wall 113, there being a lens 127 interposed to permit a more accurate reading. The scale 124 is so located that when "zero" time registers at window 126 the contact arm 76 will be resting on terminal 128 of winding 77 as shown in FIGURES 19 and 21. Furthermore, the direction of rotation of gear 121 is such that operation of timer motor 75 causes arm 76 to rotate counterclockwise, as viewed in FIGURES 19 and 21, until it reaches the other terminal 129, after which it continues counterclockwise in engagement with winding 77 to insert progressively greater amounts of resistance into the circuit. It may thus be seen that the time rheostat is one having no stops, so that its arm 76 may rotate in the same direction through any number of revolutions.

Assuming that the gear 121 and thus contact arm 76 are initially in the zero position at window 126, energization of timer motor 75 will cause counterclockwise rotation of these elements until the timer motor is de-energized through operation of the photoelectric circuit shown in FIGURE 19 and as described in detail previously. The operator may then note the length of time required by the test, but in embodiments incorporating the analog computer circuit shown in FIGURE 21 the noting of the time interval is unnecessary since the contact arm 76 is automatically set to a value permitting direct reading of the metabolic rate of the subject. It is then necessary, prior to commencement of another test, to reset gear 121 and thus contact arm 76 to zero position. This is done by turning knob 123 to cause slipping of gear 117 relative to friction washer 119 and until the zero position is achieved. It is a feature of the invention that the mounting of the friction clutch elements (FIGURE 18) on the shaft 116 of the timer motor 75, instead of on shaft 122 for the rheostat, has the very desirable effect that the contact pressure in the rheostat is in no way affected by the friction clutch.

It is of great importance that contact arm 76, after being set to zero on terminal 128 of winding 77, rotates counterclockwise for a considerable distance before coming into engagement with terminal 129 of the winding. It follows that the operation of timer motor 75 during the initial part of the test has no effect on the resistance inserted into the analog computer circuit of FIGURE 21, and this is done in order to permit the time factor to be inserted as a reciprocal function instead of a direct function as will be set forth more fully hereinafter. It has been determined experimentally that the minimum practical and accurate length of test is three minutes, whereas the maximum length of test compatible with life is 12 minutes. Accordingly, the space between terminals 128 and 129 is made 90 degrees, and the winding 77 covers 270 degrees. The various gear ratios and motor speeds are selected so that it requires contact arm 76 three minutes to travel from terminal 128 to terminal 129, and nine additional minutes to travel from terminal 129 along winding 77 back to terminal 128. Accordingly, the first three minutes of the test produce no change in the resistance inserted into the analog computer circuit, but the remaining nine minutes of the test result in insertion of a progressively increasing resistance.

There will next be described the theory and circuits relative to the electrical analog computer portions of the present metabolic rate apparatus, and with particular reference to the circuit diagram shown in FIGURE 21. The basic principles and equations employed in the determination of metabolic rates by an electrical analog computer are set forth in detail in my co-pending application Serial No. 348,259, previously cited. For present purposes the observed metabolic rate ($M_o$), in kilocal. per hour per square meter of body surface of the test subject, may be expressed by the following master equation:

$$(1) \qquad M_o = \frac{\left(\frac{273PV}{760T}\right)C_{RQ}}{\left(\frac{H^{.725}W^{.425}t}{60}\right)K_{SA}}$$

in which P is the ambient barometric pressure in millimeters of mercury, V is the volume in liters of oxygen consumed by the test subject in $t$ minutes, T is the ambient room temperature in degrees absolute, $C_{RQ}$ is the caloric equivalent of oxygen, H is the height of the test subject in centimeters, W is the weight of the test subject in kilograms, and $K_{SA}$ is a surface area constant having the value 0.007184 in adults and 0.007850 in infants.

At the respiratory quotient accepted for clinical metabolic rate measurements, the coefficient $C_{RQ}$ has the value 4.825 kilocal. per liter of oxygen measure at standard laboratory conditions for normal temperature and pressure (N.T.P.). If, therefore, 1.036 liters of oxygen at N.T.P. is selected as the test charge, the numerator of the Equation 1 has the integral value of 5.000 kilocals. This amount of pure oxygen weighs 1.480 grams and is easily confined within a small disposable pressurized cartridge for use during a test, so that a simple gravimetric standard is established for the test procedure. By thus employing a standard oxygen charge, the usually difficult measurement of oxygen volume, with its necessary correction for ambient temperature and pressure, is avoided. However, it is to be understood that the apparatus may also be employed with a non-standard test charge in accordance with principles set forth in my co-pending application referred to above.

By substituting the oxygen parameter 5.000 for the numerator of Equation 1, and multiplying by the time conversion constant 60 in the denominator of Equation 1, the equation may be rewritten as:

$$(2) \qquad M_o = \frac{300}{H^{.725}W^{.425}tK_{SA}}$$

Equation 2 represents the general form in which the electrical analog computer circuit of FIGURE 21 handles the height, weight, and time variables by converting them into voltages and producing an output reading on a voltage responsive meter (FIGURE 20) calibrated to read directly in terms of metabolic rates. The computer is of the direct transfer function class, that is to say the output voltage is directly proportional to metabolic rates instead of inversely proportioned thereto, so that the output meter will have uniformly graduated scales calibrated to indicate metabolic rate directly. The time variable is inserted automatically by the time rheostat contact arm 76 and winding 77 as set forth above, the height variable is inserted manually by use of a height potentiometer indicated at 131 in FIGURE 21 and operated by a knob 132 shown in FIGURE 1, and the weight variable is similarly inserted by means of a weight potentiometer 133 controlled by a knob 134.

Both the height potentiometer 131 and weight potentiometer 133 are standard linear elements, as are the time rheostat and all other potentiometers and rheostats employed in the computer. The non-linearity introduced by the exponential functions in Equation 2, as well as in connection with certain other potentiometers and rheostats in the circuit, is compensated for during calibration of the apparatus in accordance with principles described in my previously filed co-pending application, and as will be set forth hereinafter.

It is often desirable to express metabolic rate without reference to body surface area, and for this purpose Equation 2 may be further modified to read:

$$(3) \qquad M_{total} = \frac{300}{t} \text{ kilocals. per hour, or}$$

$$\frac{7200}{t} \text{ kilocals. per 24 hours}$$

This produces the total metabolic rate, which is of importance in computing diets and evaluating overall metabolic requirements.

A further equation solved by the computer may be written quite simply, but is very difficult to compute automatically and in a simple and practical manner. It is the equation for relative rate and is expressed as percent deviation from normal. This equation is written as follows:

$$(4) \qquad D = 100 \frac{M_o - M_s}{M_s}$$

where D is the percent deviation of the observed rate (Equation 2) of the test subject from the standard rate considered normal for a person of the same age and sex as the test subject, $M_o$ is the observed rate for the test subject, and $M_s$ is the metabolic rate for a standard person of the same age and sex. The standard rate ($M_s$) is conventionally taken from a set of tables, known as the Mayo table, which gives the observed rate for standard subjects of every age and both sexes. As will be set forth more fully hereinafter, the construction of the present computer to read the percent deviation (D) directly is greatly simplified due to the fact that the overall transfer function of the computer is a direct one.

In the circuit shown in FIGURE 21 three triode vacuum tubes 137, 138 and 139 are shown as connected in cascaded cathode follower arrangement, and a fourth triode 140 is connected as will be described. The plates of all of the vacuum tubes 137–140 are supplied with positive direct voltage from a voltage source indicated at 142, while the cathodes of all of the vacuum tubes are supplied with negative direct voltage from a second voltage source indicated at 143. The voltage of each of the sources 142 and 143 is preferably in the neighborhood of 150 volts. The grid of each tube 137–140 is connected through a high (for example 10 megohms) grid-leak resistor 144 to ground, these resistors 144 serving to conduct direct grid current and thus provide the grid bias. Resistors 144 are, however, sufficiently high as to pass substantially no alternating current, the alternating voltage being much lower than the 150 volt direct voltage applied to the plate and cathode of each tube. In order to insure that the various tubes 137–140 are isolated from each other insofar as direct current is concerned, a capacitor 146 is connected to the grid of each tube, the connection for resistor 144 being between capacitor 146 and the grid.

The alternating input voltage to the analog computer circuit is indicated at 147 as comprising a standard 110 volt 60 cycle source. Where the source 147 is a house lighting circuit instead of a special constant voltage supply, variations in the voltage may be compensated for to produce a correct metabolic rate reading and as will be indicated subsequently. The source 147 is connected through a variable "line adjust" resistor 148 to a pair of resistors 150 and 150a, these resistors being tapped at various points to provide the desired alternating voltage for various portions of the circuit. A "charge selector" switch 149 has one of its terminals, numbered 151, connected to a center tap between resistors 150 and 150a, the voltage at this point being preferably 36 volts in the illustrated example. A second terminal 152 of switch 149 is tapped to resistor 150 at such a point that the voltage is exactly half that at terminal 151, or 18 volts in the example. The contact arm for "charge selector" switch 149 is connected through a lead 153 to terminal 129 of time rheostat winding 77, and through a second lead 154 to a normally open "line adjust" switch 156, for example of the push button type. Switch 156, in turn, is connected both through a lead 157 to the contact arm 76 of the time rheostat, and through a lead 158 and capacitor 146 to the grid of the first triode 137. Lead 158 also connects to one side of a time build-out resistor 159, the other side of resistor 159 being connected to the positive side of direct voltage source 143 and also to a lead 161. The lead 161 is connected to ground, and also to the voltage supply circuit between resistor 150 and voltage source 147. In order to minimize the loading error which the voltage supply circuit introduces into the analog computer, it is important that the impedance of resistances 150 and 150a be kept low as compared to the impedance of the load.

The "line adjust" resistor 148 is manually controlled by a knob 163 (FIGURE 1) and may be adjusted, as will be described subsequently, to compensate for variations in the voltage supplied by element 147. The "charge selector" switch 149, controlled by a knob 164 shown in FIGURE 1, is normally turned to the illustrated position at which its arm contacts the 18 volt terminal 152. This is the normal position and is used whenever a single standard oxygen charge is employed for the test. However, during the course of the test the operator may notice that the standard charge is being consumed at a very rapid rate, indicating that the subject has a very high metabolism, which may mean that the entire charge will be consumed before the three minute interval required by the time rheostat contact arm 76 to travel from terminal 128 to terminal 129. In such instances the operator inserts a second standard oxygen charge and turns knob 164 until the charge selector contact arm engages terminal 151 which is at twice the voltage of terminal 152. The voltage impressed on triode 137 is then double the voltage impressed when terminal 152 is contacted, so that the output reading of the computer is the same despite the fact that two oxygen charges are used instead of one. In this manner, the machine may be adapted to read, with great accuracy, the metabolic rates of persons having very high metabolism. It is pointed out that although it is preferable to employ two standard oxygen charges as indicated previously, the oxygen charges need not be standard so long as they are equal in weight. Furthermore, unequal charges may be employed so long as they are known and the voltages at terminals 151 and 152 properly correlated.

According to the present invention, the time variable is inserted as a reciprocal and in a very simple and effective way, by making the resistance of time build-out resistor 159 the same as the resistance introduced by the time rheostat after contact arm 76 has been driven for twice the length of time required for its travel from terminal 128 to terminal 129. Thus, if contact arm 76 requires three minutes to travel from terminal 128 to terminal 129, or to the dashed line position 76a, and three minutes more to travel to the dashed line position 76b, the resistance of the portion of winding 77 between terminal 129 and position 76b must be equal to the resistance of time build-out resistor 159. When the time rheostat and the build-out resistance 159 are related as stated above, and assuming that arm 76 has traveled counterclockwise for three minutes, to position 76a, the voltage impressed on the first cathode follower stage will be the maximum value. This is because no part of the resistance of time rheostat winding 77 is then introduced into the circuit, a direct path being created from terminal 129 to lead 157 so that the output meter reading is the same as when "line adjust" switch 156 is closed.

After the contact arm 76 has been driven counterclockwise for another three minutes of test, to the 76b position at which the resistance inserted by the time rheostat is equal to the resistance of build-out resistor 159, a voltage dividing effect is produced by which voltage impressed on the first cathode follower stage is exactly half of that introduced when contact arm 76 is in the 76a position. Furthermore, and due to the linearity of time rheostat winding 77, the voltage impressed on the first cathode follower stage after contact arm 76 has been actuated for an additional three minutes will be one-third of the impressed voltage when the contact arm is in engagement with terminal 129, and will be one-fourth of this voltage after an additional three minutes and when the arm 76 engages terminal 128. It may thus be seen that the combined operation of the time rheostat and its build-out resistor 159 is to insert the time variable into the analog computer circuit as a reciprocal instead of a direct function, yet in a highly simple and accurate manner.

To illustrate the above, it will be observed that when contact arm 76 is engaged with terminal 129 the full 18 or 36 volt voltage, depending upon the position of "charge selector" switch 149, is impressed across resistor 159 and thus across the grid to ground input of the first cathode follower stage incorporating tube 137. However, by the time the contact arm has been driven to the 76b position, half of the 18 or 36 volt voltage will be impressed on the sector of winding 77 between terminal 129 and the arm at 76b, and the other half will be impressed across resistor 159. Since the voltage across resistor 159 is thus cut in half, and since this voltage is impressed on the input (grid to ground) of the first cathode follower stage embodying tube 137, it may be seen that the input voltage to the first cathode follower stage and to tube 137 has been cut in half. Similarly, by the time the arm 76 has traveled an additional three minutes, two-thirds of the impressed voltage is taken up by the winding 77 and only one-third by resistor 159 and the first cathode follower stage.

Proceeding now to a description of additional elements of the analog computer circuit of FIGURE 21, it will be observed that the winding 165 of height potentiometer 131 is connected, in series with a build-out resistor 166, between the cathode of the first triode 137 and a lead 168 connected to the negative side of voltage source 143. Similarly, the winding 169 of weight potentiometer 133 is connected in series with its build-out resistor 170 between the cathode of the second triode 138 and lead 168. The contact arm 173 of the height potentiometer is connected to one terminal 174 of a first meter switch 175, the latter having its contact arm 176 connected through a capacitor 146 to the grid of the second triode 138. A second terminal 178 of meter switch 175 is connected directly to the cathode of triode 137, so that variations in the setting of height potentiometer 131 will not affect the meter reading when arm 176 engages terminal 178.

A second meter switch 179, having its contact arm 180 connected through a capacitor 146 to the grid of the third triode 139, and its two terminals 182 and 183 connected, respectively, to the contact arm 184 of weight potentiometer 133 and directly to the cathode of triode 138, serves the same function for the weight potentiometer and its build-out as does the first meter switch 175 for the height potentiometer and build-out. It is to be understood that although the meter switches 175 and 179, as well as additional third and fourth meter switches 186 and 187 to be described below, are shown as separate switches they are preferably incorporated in a single multi-deck switch controlled by a knob 188 on the control panel 27 shown in FIGURE 1.

The third meter switch 186 is provided with five terminals or contacts 186a, 186b, 186c, 186d, and 186e, and the fourth meter switch 187 is also provided with five terminals 187a, 187b, 187c, 187d, and 187e. It is to be understood that the switches 186 and 187 are mechanically connected so that their respective arms 193 and 194 will always be in engagement with corresponding terminals 186a—187a, 186b—187b, etc.

The cathode of the third triode 139 connects to a lead 195 one end of which is connected through a cathode resistor 197 to lead 168, and the other end of which is connected to meter switch terminal 186e. Lead 196 is also parallel connected through three meter resistors 198, 199 and 200 to the respective meter switch terminals 186a, 186b and 186c. The remaining terminal 186d of meter switch 186 is connected to ground. The contact arm 193 of meter switch 186 is connected through a blocking capacitor 202 to one input terminal of a full wave rectifier circuit 203, the other input terminal being connected to contact arm 194 of meter swtich 187. The output of rectifier circuit 203 is connected to a suitable voltage responsive meter 204 (FIGURE 1) having its face calibrated to read directly in terms of metabolic rates as shown in FIGURE 20. The terminals 187a, 187b and 187c of meter switch 187 are all connected to ground as indicated.

It will be observed that when the switches 186 and 187 are at their terminals "a", the output voltage (cathode to ground) from the third cathode follower stage, embodying triode 139, is applied to the meter from the cathode through lead 196, resistor 198, capacitor 202, rectifier 203, meter 204 and meter switch 187 to ground. It is to be remembered that lead 168 is also grounded, as far as alternating voltage is concerned, through voltage source 143, so that the meter (with its resistor 198) reads the output voltage (across resistor 197) of the third cathode follower stage. Correspondingly, when the switches 186 and 187 are both on their respective terminals "b" and "c", the output voltage of the third cathode follower stage is applied to the meter through resistors 199 and 200. The capacitor 202 has the effect of blocking the direct voltages from the stages embodying triodes 137–139, and the rectifier 203 serves the purpose of supplying direct current to the meter 204, the latter being of the D.C. type.

Meter 204 is provided, as shown in FIGURE 20, with four scales a, b, c—d, and e. Scale a is read when the meter switches 186 and 187 are on their positions "a", in order to give the total metabolism of the subject as set forth in Equation 3 previously given. Scale b is read when the switches 186 and 187 are in their positions "b", in order to give the observed metabolic rate of the test subject in accordance with Equations 1 and 2. Scale c—d is read when the switches 186 and 187 are on either of positions "c" or "d", and gives observed metabolic rate, when the switches are in "c" positions in accordance with Equations 1 and 2 but with an expanded and thus more accurate scale. When the switches are in "d" positions scale c—d reads standard rate as will be described. Scale e is read when switches 186 and 187 are on their positions "e", and gives the percent deviation in accordance with Equation 4.

In order to read the total metabolism of the test subject on scale a of the meter 204 as shown in FIGURE 20, the operator turns meter switches 186 and 187 to their position "a" and turns meter switches 175 and 179 so that their contact arms 176 and 180 are in engagement with terminals 178 and 183. Because of the positions of the switches 175 and 179, the height and weight potentiometers 131 and 133 are, in effect, bypassed so that the meter 204 is responsive to time only and not to height and weight. To insure that the voltage source 147 is supplying a voltage the same as that for which the instrument was calibrated at the factory, the operator presses "line adjust" button 156 to short out the time rheostat, and then adjusts the "line adjust" resistor 148 until the meter 204 reads 2400 kilocalories per twenty-four hours, or full scale. The operator then releases the button 156 to cause the meter to be affected by the resistance inserted by the time rheostat. If the test has only run three minutes so that the rheostat arm 76 is at the position 76a, in contact with terminal 129, no resistance from winding 77 is inserted into the circuit and the reading will be full scale, or the same as when "line adjust" switch 156 is closed. The above is in accordance with Equation 3 since it will be observed that when the time is three minutes, which is required by arm 76 to travel from terminal 128 to 129, the output reading should be 7200 divided by 3 or 2400 kilocal. per twenty-four hours. If the test subject has required six minutes instead of three in order to consume the oxygen charge, the voltage will be cut in half as previously described in detail, and the meter will read 1200 kilocal. per twenty-four hours, both the meter scale and the winding 77 being linear. It may thus be seen that scale a of the meter 204 will give an accurate reading of the total metabolism of the test subject. Scale a is, of course, calibrated through use of Equation 3 and correlating with the time rheostat.

To determine the observed metabolic rate of the test subject, in kilocalories per hour per square meter of the subject's body surface area (Equations 1 and 2), the operator adjusts switches 186 and 187 to either of positions "b" and "c," and adjusts switches 175 and 179 so that their arms 176 and 180 are in engagement with terminals 174 and 182. The reading on scale "b" of the meter 204 will then be affected not only by the time rheostat but also by the settings of the height and weight potentiometers 131 and 133. It is to be understood that the height and weight of the test subject may be employed to determine the square meters of body surface area in accordance with equations given in my co-pending application Serial No. 348,259, with the height factor being raised to the .725 power and the weight factor being raised to the .425 power. The height and weight potentiometers 131 and 133, when calibrated as will next be described, may thus be employed to produce an electrical effect on meter 204 proportional to the square meters of body surface area of the test subject.

Calibrations for height potentiometer 131 are provided between 42 inches and 78 inches, the 42 inch mark being adjacent terminal 206 of height winding 165 and the 78 inch mark being adjacent terminal 207. When the height potentiometer arm 173 is in engagement with terminal 206, the transfer function (ratio of potentiometer output voltage to potentiometer input voltage) is unity, or the same as when the arm 176 of meter switch 175 is in engagement with terminal 178. When, on the other hand, arm 173 engages terminal 207, the transfer function of the potentiometer is 0.6384 in the illustrated example. The output voltage of the potentiometer is then the lowest, corresponding to the high reading of 78 inches on the scale, it being remembered that height and weight appear in the denominator of Equation 2. Intermediate values between the 42 and 78 inch readings may be found by using the following expression for the transfer function at any height $H_n$:

$$(5) \qquad TF^{H_n} = \left(\frac{H_{42}}{H_n}\right)^{.725}$$

where $n$ equals 42, 43 ... 78. Some of the values would then be as follows:

| Height: | Transfer function |
|---|---|
| 42 | 1.0000 |
| 43 | .9832 |
| 70 | .6905 |
| 78 | .6384 |

The build-out resistor 166 for the height potentiometer has the desired effect of greatly spreading the potentiometer scale, and has a resistance value which is determined, with reference to the total resistance of winding 165, by means of the formula:

$$(6) \qquad R_f = \frac{.6384 R_p}{1 - .6384}$$

where $R_p$ is the total resistance of winding 165, and $R_f$ is the resistance of build-out 166.

The weight potentiometer 133 and its build out 170 are calibrated in accordance with the principles set forth in connection with the height elements. Accordingly, the minimum value of fifty pounds is marked adjacent terminal 208 of the weight winding 169, and the maximum weight value of 300 pounds is marked adjacent terminal 209. Intermediate values are set in accordance with the following equation for the transfer function at any weight $W_n$:

$$(7) \qquad TF^{W_n} = \left(\frac{W_{50}}{W_n}\right)^{.425}$$

where $n$ equals 50, 51, 52. .. 300. Typical values would be:

| Weight: | Transfer function |
|---|---|
| 50 | 1.0000 |
| 55 | .9603 |
| 200 | .5548 |
| 300 | .4670 |

The build out resistor 170 has a resistance determined by means of the following formula:

$$(8) \qquad R_f = \frac{.4670 R_p}{1 - .4670}$$

where $R_p$ is the total resistance of winding 169, and $R_f$ is the resistance of build out 170. It will be noted, as in the case of the height build out, that the decimal used in the expression for the build-out resistance is the same as the transfer function of the associated potentiometer winding at the maximum scale value.

Although the meter face is calibrated in metric units, the potentiometers may still be calibrated in inches and pounds since the conversion factors cancel out in Equations 5 and 7.

In order to adjust the meter resistor 199 to effect the proper calibration of scale b of the meter face (FIGURE 20), it is merely necessary to shift contact arms 176 and 180 to terminals 178 and 183, and shift contact arms 193 and 194 to terminals 186a and 187a. The time rheostat is then the only variable in the circuit, and its contact arm 76 is adjusted until the meter 204 reads 1890 kilocalories per twenty-four hours on scale a. Contact arms 176 and 180 are then shifted to terminals 174 and 182, contact arms 193 and 194 are shifted to terminals 186b and 187b, and resistor 199 is adjusted until meter 204 reads full scale. The resistor 199 is thus adjusted to a lower value than resistor 198, since the meter on scale b reads full value at a lower voltage than when on scale a. The number 1890 is selected in this calibration procedure since 1890 when divided by the minimum body area for which the instrument is designed will equal 100 kilocalories per hour per square meter, the desired upper point on scale b.

The above calibration is, of course, effected with the height and weight potentiometers 131 and 133 set to read minimum scale, with their contact arms 173 and 184 in engagement, respectively, with terminals 206 and 208. To arrive at the minimum value on scale b, the potentiometers 131 and 133 are adjusted to full scale, with arms 173 and 184 in engagement with terminals 207 and 209, and the time rheostat is also set to full scale. The minimum marking is then calculated from Equation 2 and placed on scale b at the point where the meter is reading, and intermediate values are interposed in a linear fashion as shown in FIGURE 20.

Scale c—d of meter 204 is calibrated in accordance with the principles set forth in connection with the calibration of scale b, except that scale c—d is more open and has a maximum reading of 60 kilocalories per hour per square meter, and a minimum reading of 15 kilocalories per hour per square meter. It follows that the resistance of meter resistor 200 will be substantially lower than that of resistor 199. It is to be understood that when meter switches 186 and 187 are set so that their contact arms 193 and 194 are in contact with terminals 186c and 187c, the reading on scale c—d will be the same as the reading on scale b when contact arms 193 and 194 are in engagement with terminals 186b and 187b.

It is of extreme importance that the height and weight potentiometers and their build outs are connected as loads in cathode follower amplifier circuits, a cathode follower amplifier being one in which the load is between cathode and ground instead of between plate and ground as in most amplifiers. This location of the potentiometers is employed because the input impedance of a cathode follower amplifier is extremely high, so that the actual impedance of the potentiometer itself need not be high as compared to the impedance of the potentiometer of the preceding stage. Thus, the impedance of potentiometer winding 165 and build out 166 need not be high as compared to the impedance of the time rheostat winding 77, etc., and the impedance of the weight potentiometer winding 169 and its build out 170 need not be high as compared to that of height winding 165 and resistor 166. This is to be contrasted with the multiplying of resistances necessary in the previous metabolic rate computer circuit described in my prior application Serial No. 348,259.

Just as the cathode follower stages embodying triodes 137 and 138 prevent interaction between the height potentiometer 131, weight potentiometer 133 and time rheostat winding 77, the cathode follower stage including triode 139 prevents interaction and loading error between weight potentiometer 133 and the resistance incorporated in the circuit for meter 204, including that of resistors 198–200. Similarly, the triode 140 prevents the meter resistors from causing loading error and interaction relative to the age-sex elements next to be described, triode 140 being connected in cathode follower arrangement relative to such elements.

To expand upon the above theory, a cathode follower amplifier is a single stage amplifier in which the feedback ratio is unity, by which is meant that all the output voltage is applied to the input circuit in phase opposition to the signal. This feedback voltage is in series with the input signal and has the effect of multiplying the input impedance of the tube by a factor comprising the voltage gain of the tube alone multiplied by the feedback ratio. Accordingly, a very high impedance is presented by the preceding voltage source, as above indicated, and loading errors and interaction are made negligible. At the same time, the feedback voltage is in shunt with the output and this has the effect of causing the effective plate resistance to be greatly reduced, the actual plate resistance being divided by the same factor that multiplied the input impedance as before stated. In the tubes used in the present circuit this results in an effective plate resistance of about 400 ohms, which is negligible in comparison with the resistance of the load. As a result, the value of plate resistance is not an appreciable factor in the operation of the circuit, so that the use of cathode follower amplifiers has the additional very desirable effect of rendering the analog computer circuit immune, to a large extent, to any variations in tube characteristics.

Proceeding next to a description of the age-sex elements of the analog computer circuit, including the means for determining percent deviation as set forth in Equation 4 for indication on scale e of meter 204, a knob 211 on control panel 27 (FIGURE 1) is mechanically coupled to both an age-sex potentiometer 212 and an age-sex rheostat 213. One end of the winding 214 of potentiometer 212 is tapped through a first build out resistance 216 to the resistor 150 of the voltage supply circuit, preferably at a point giving a voltage of 12 volts. The other end of winding of 214 is connected through a second build out 217 to ground, and the contact arm 218 of potentiometer 212 is connected through a blocking capacitor 146 to the grid of triode 140.

The cathode of triode 140 is connected through a lead 219 to one side of a variable resistor 221, the other side of the resistor being connected to terminal 187d of meter switch 187. The lead 219 also connects through a resistor 222 to lead 168, and through a lead 223 and build out resistor 224 to the winding 226 of age-sex rheostat 213. The contact arm 227 of rheostat 213 is connected through a lead 228 to terminal 187e of meter switch 187. The resistance of resistor 222 should be approximately equal to that of resistor 197.

The meter scale c—d (FIGURE 20), read when switches 186 and 187 are in their positions "c" to give the observed metabolic rate of the test subject, is the same as is read when the switches 186 and 187 are in positions "d." In the latter case scale c—d reads the standard metabolic rate of a person of the same age and sex as the test subject, as given by the Mayo tables, and after turning of the age-sex potentiometer 212 to the appropriate setting after its calibration as will be described. The "standard" age-sex voltage is supplied from resistor 150 of the voltage supply circuit, through build out resistor 216, a portion of winding 214, contact arm 218 and through capacitor 146 to the input (grid to ground) of triode 140. The cathode of triode 140 is connected through lead 219, resistor 221, terminal 187d, arm 194, meter rectifier 203, meter 204, capacitor 202, arm 193 and terminal 186d to ground. Thus, the output voltage of the cathode follower embodying triode 140 is read by the meter through resistor 221, it being remembered that the cathode follower output voltage is cathode to ground, or the voltage across resistor 222. This voltage corresponds to the output voltage of the cathode follower stage including tube 139, and read through resistor 200 to ground when switches 186 and 187 are in "d" positions. Since both of these voltages are read on scale c—d of meter 204, it is of extreme importance that resistor 221 be set to the same value as resistor 200 in order that the meter readings will be true and accurate.

Two age-sex scales are provided on panel 27 adjacent knob 211 for the potentiometer 212 and rheostat 213. One scale is for males of various ages and the other for females of various ages. These scales are calibrated by the very simple procedure of setting switches 186 and 187 on their "d" positions and then turning knob 211 to produce any desired reading on scale c—d of the meter. The Mayo tables are then checked to note the age at which a male would have the meter reading in question, and that age is marked on the "male" scale adjacent a pointer on knob 211. The tables are then again checked to note the age at which a female would have the meter reading, and this age is marked on the "female" scale. The knob 211 is then turned to a number of positions and the process repeated until the scale is fully calibrated. The build out resistors 216 and 217 are of such value that the winding 214 of potentiometer 212 will represent the metabolic rates of approximately the full range of ages and both sexes.

With the above described circuit, the operator can turn switches 186 and 187 to their "c" positions and determine the observed metabolic rate of the test subject, and then turn the switches to their "d" positions to determine the standard metabolic rate for the same age and sex, potentiometer 212 having previously been set for the age and sex of the test subject. Then, through use of Equation 4, he can determine the percent deviation of the observed metabolic rate for the test subject from the standard metabolic rate. However, the present analog computer circuit provides a highly simple and effective means for indicating the percent deviation directly on scale e of meter 204.

When the meter switches 186 and 187 are on their "e" positions, the rheostat 213 and build out 224 act as meter resistors for the meter 204 as it indicates the voltage between points 231 and 232. This circuit may be traced from point 231 through lead 196, terminal 186e, capacitor 202, meter rectifier 203, meter 204, terminal 187e, lead 228, arm 227, a portion of winding 226, and build out resistor 224 to point 232. The potential at point 231 will be the same as the potential at point 232 if the output voltage from triode 139, representing the observed metabolic rate of the test subject, is the same as the output voltage from triode 140, representing the standard metabolic rate of a person of the same age and sex. This will be more readily understood when it is considered that the voltage across resistor 197 is the same as the voltage read by the meter when switches 186 and 187 are on their "c" positions, and the voltage across resistor 222 is the same as that read by the meter when the switches are on their "d" positions. In this connection it is to be remembered that lead 168 is at ground potential insofar as alternating current is concerned, despite the presence of direct voltage source 143, so that the voltage from points 231 and 232 through resistors 197 and 222 to ground are the same voltages as read by the meter from point 231 to ground through the meter and from point 232 to ground through the meter. Since the tap from resistor 150 to the age-sex circuit is of the same instantaneous polarity as the tap through switch 149 to the computer circuit, it follows that the voltage at point 231 will be of the same instantaneous polarity as the voltage at point 232 and that if these voltages are the same the meter (when operating on scale $e$) will read zero percent deviation.

From the above it will be apparent that the meter, when switches 186 and 187 are on "$e$" positions, will respond to deviation between the observed metabolic rate of the test subject and the standard rate. It will next be described that the meter does not merely read deviation, but instead percent deviation. The obtaining of a direct reading of percent deviation is much more difficult than the reading of mere deviation, since in the former instance a division operation must be performed in addition to a subtraction operation, as indicated in Equation 4.

The critical relationship by which the meter when operating on scale "$e$" will give percent deviation and not merely deviation alone, is that the combined resistance of rheostat 213 and its build out 224 is equal to a constant times the output voltage of the cathode follower stage embodying tube 140, regardless of the position at which knob 211 for elements 212 and 213 is set. It was demonstrated above that the voltage read by the meter when switches 186 and 187 are on their "$e$" positions is $E_{OB}-E_{STD}$ where $E_{OB}$ is the output voltage (cathode to ground) from the third cathode follower stage incorporating tube 139, and $E_{STD}$ is the output voltage from the cathode follower incorporating tube 140.

The deflection of meter 204 will then be $$K_1 = \frac{E_{OB} - E_{STD}}{r_m}$$

where $r_m$ is the meter resistance and is equal to the combined resistances of rheostat 213 and build out 224, and $K_1$ is a constant.

The combined resistances of rheostat 213 and build out 224 are made such that $r_m$ equals $K_2 E_{STD}$, where $K_2$ is a separate constant different from the $K_1$ constant given above.

By combining the above equations it will be seen that the meter deflection will equal:

$$\frac{K_1}{K_2}\left(\frac{E_{OB} - E_{STD}}{E_{STD}}\right)$$

It will be seen that this latter expression corresponds to that for percent deviation (Equation 4), except for the constants which are taken care of by the calibration of the meter.

To adjust rheostat 213 and build out 224, so that their combined resistances will equal a constant times $E_{STD}$, the observed voltage ($E_{OB}$ is cut out, and resistor 224 adjusted until meter 204 reads full scale (100 percent deviation) regardless of the position to which knob 211 is set. This may best be done by adjusting the contact arm 76 of the time rheostat to a position between terminals 128 and 129 of winding 77, all voltage to the meter then being cut out except for the output voltage from triode 140. Since there is no $E_{OB}$, corresponding to observed metabolic rate, it will be seen from Equation 4 that any setting of age-sex potentiometer 212 and rheostat 213 should read 100 percent and this occurs when build out 224 is adjusted as indicated.

To illustrate the above, let it be assumed that build out resistors 216 and 217 have such values that potentiometer 212 will apply forty percent of the supply voltage from resistor 150 to the meter as $E_{OB}$ when at minimum setting, and eighty percent when at maximum setting. Let it be further assumed that resistor 224 is so set that meter 204 will read a desired full scale point (100 percent deviation) when rheostat 213 is a minimum setting. Rheostat 213 must then be constructed to have, when at maximum setting, the same resistance as resistor 224. When, therefore, arms 218 and 227 are shifted together from minimum to maximum settings, the total meter resistance is doubled by rheostat 213 as the voltage applied to the meter is doubled through operation of potentiometer 212. Both voltage and resistance being doubled, and $E_{STD}$ being cut out, meter current (and thus deflection) will remain constant at full scale as indicated. The windings 214 and 226 being linear, the above holds true for intermediate settings of arms 218 and 227 which move conjointly. This and other illustrations are based upon the assumption that meter 204 itself has no resistance, it being understood that meter resistance may be made negligible or compensated for by appropriate selection of the other resistances.

After the full scale point (100% deviation) is applied to meter scale $e$ in accordance with principles indicated above, intermediate values are applied by reference to the calibration curve (applied voltages versus deflection) for meter 204. Thus if the meter curve is such that 100 percent deviation occurs at 100 volts, 50 percent is marked at the meter reading when 50 volts are applied, 25 percent at the reading when 25 volts are applied, etc.

The construction of the D.C. meter 204 is such that it will deflect in the same direction regardless of whether there is a positive percent deviation or a negative percent deviation. However, the operator may readily determine whether the percent deviation is positive or negative by merely noting whether the reading of observed metabolism when switches 186 and 187 are on their "$c$" positions is above or below the Mayo table reading obtained by switching the switches 186 and 187 to their "$d$" positions.

To briefly summarize the operation of the apparatus for determining metabolic rates, the operator first turns knob 123 to adjust time rheostat arm 76 to its zero position on terminal 128, by noting the zero mark in window 126 (FIGURE 16). He then adjusts bottom bellows wall 31 to the reference level position through use of control valve knob 41 and its associated valve element 37. This zero position may be determined with great accuracy since it is the exact position when the "spirometer" pilot 78 is first extinguished. The standard test charge is then introduced into bellows 29 and the face mask is placed on the test subject, the control valve knob 41 being turned to "room air" position until the test subject becomes accustomed to the face mask and is breathing normally and regularly. Knob 41 is then turned to "cycling" position, connecting the face mask M to the bellows 29 and simultaneously causing the timer motor 75 to start operating and drive the arm 76 of the time rheostat, and additionally effecting lighting of "cycling" pilot 80. The test then continues, with the subject exhaling into and inhaling from the bellows 29, and the operator need do nothing except observe whether the subject is absorbing the oxygen sufficiently rapidly to warrant inserting an additional oxygen charge and turning charge selector switch 149 (FIGURE 21) from terminals 152 and 151 for reasons explained above in connection with the operation and functioning of the charge selector switch.

As the end of test approaches, the bottom bellows wall 31 rises above the light beam from exciter lamp 66 during the upper part of its excursions to cause blinking of spirometer pilot 78 and warns the operator that the end of test is approaching. As soon as the oxygen charge is completely consumed the time delay circuit will operate to stop operation of timer motor 75 and extinguish "cycling" pilot 80. The operator then switches the control valve knob 41 back to "room air" position, and turns the meter switch knob 188 until switch 175 (FIGURE 21) is set to terminal 178, switch 179 to terminal 183, and switches 186 and 187 to terminals 186$a$ and 187$a$. The "line adjust" switch 156 is then closed, and "line adjust" knob 163 is turned to adjust the resistor 148 until the meter 204 (FIGURE 20) reads full scale.

The "line adjust" switch 156 is then released to permit its opening, and the total metabolism of the test subject is read on meter scale $a$. Meter switch knob 188 is then turned to adjust switch 175 to terminal 174, switch 179 to terminal 182, and switches 186 and 187 to their "$b$" positions. In addition, height potentiometer 131 is set to the height of the subject, weight potentiometer 133 is set to the weight of the subject, and the age-sex elements are set to the appropriate age and sex of the subject, all through manual turning of the respective knobs 132, 134 and 211. Scale $b$ will then read the observed metabolic rate of the test subject in kilocalories per hour per square meter, and if the reading on scale $b$ is in the relatively normal range the operator switches the meter switch until switches 186 and 187 are on their "$c$" positions. A more accurate reading of metabolic rate is then obtained on scale $c$—$d$, after which switches 186 and 187 are turned to their "$d$" position to read (also on scale $c$—$d$) the normal metabolic rate for a subject of the same age and sex as the test subject, it being noted whether or not the observed rate is higher or lower than normal. Finally, switches 186 and 187 are turned to their "$e$" positions and percent deviation is read on the $e$ scale of the meter.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In an apparatus for determining metabolic rates and including a collapsible gas container charged with oxygen and including means connecting the same in a closed gas circuit with an attachment by which a test subject can inhale oxygen from and exhale oxygen into said container, said circuit including means to eliminate exhaled carbon dioxide so that said container will collapse as said test subject consumes said oxygen; that improvement which comprises computer means adapted to be manually activated by the operator simultaneously with initiation of oxygen consumption by the test subject from said oxygen charged container and to remain activated to compute the metabolic rate of the test subject while the oxygen charge of said container is being consumed, said computer means comprising an electrical computer circuit of the analog type connected to a source of voltage, said computer circuit including variable means having a charge selector switch adapted to be set in accordance with the stabilized rate at which said test subject consumes said oxygen from said container as indicated by the rate of collapse thereof, and when thus set to alter the voltage from said voltage source as a function of said rate of oxygen consumption, an electrical indicating instrument connected in said computer circuit and responsive to the voltage from said voltage source as altered by said variable means, and means connected in the input of said computer circuit having a low impedance relative to the load impedance of the computer circuit proper to prevent said indicating instrument from loading said variable means and creating an error in the reading of said indicating instrument.

2. In an apparatus for determining metabolic rates and including a collapsible gas container charged with oxygen and including means connecting the same in a closed gas circuit with an attachment by which a test subject can inhale oxygen from and exhale oxygen into said container, said circuit including means to eliminate exhaled carbon dioxide so that said container will collapse as said test subject consumes said oxygen, that improvement which comprises computer means adapted to be manually activated by the operator simultaneously with initiation of oxygen consumption by a test subject from said oxygen charged container and to remain activated to compute the metabolic rate of the test subject while the oxygen charge of said container is being consumed, said computer means comprising an electrical computer circuit of the analog type connected to a source of alternating voltage, said computer circuit including a variable impedance having a charge selector switch adapted to be set in accordance with the stabilized rate at which said test subject consumes said oxygen from said container as indicated by the rate of collapse thereof, said variable impedance being adapted when thus set to alter the voltage from said voltage source in a manner proportional to said rate of oxygen consumption, an electrical indicating instrument connected in said computer circuit and responsive to the voltage from said voltage source as altered by said variable impedance, and a cathode follower amplifier connected in said circuit between said variable impedance and said indicating instrument to prevent the impedance of said indicating instrument from introducing an error in the reading thereof as determined by said variable impedance.

3. The invention as claimed in claim 2, in which said computer circuit additionally includes a variable impedance means for altering the voltage in said computer circuit as a function of the body surface area of said test subject, and cathode follower means for preventing interaction between said variable impedance means and said variable impedance.

4. In an apparatus for determining metabolic rates and including a collapsible gas container charged with oxygen and connected in a closed gas circuit with an attachment by which a test subject can inhale oxygen from and exhale oxygen into said container, said apparatus including means in said closed circuit to eliminate exhaled carbon dioxide exhaled by the test subject so that said container will collapse as said test subject consumes said oxygen, electrical computer means having means for activating the same simultaneously with the initiation of the consumption of said oxygen charge by the test subject and operable to complete computation of the test subject's metabolic rate to exhibit the result as a direct metabolic rate reading simultaneously with the consumption of the oxygen charge by the test subject, said computer means comprising an electrical circuit having operably connected therein a plurality of cathode follower amplifiers connected in cascade arrangement with the output from said cascaded amplifiers being connected to a voltage responsive indicating meter calibrated to read directly in terms of metabolic rate, the input to said cascaded amplifiers being adapted to be connected to a source of voltage, a variable impedance connected between cathode and ground in one of said amplifiers and adapted to be set in accordance with the height of said test subject, a variable impedance connected between cathode and ground in another of said amplifiers and adapted to be set in accordance with the weight of said test subject, whereby the voltage transmitted from said voltage source to said meter is altered by variation of said impedances in accordance with the height and weight of said test subject, and means additional to said variable impedances for altering the voltage transmitted from said voltage source to said meter, said last named means being adapted to be set in accordance with the stabilized rate at which said test subject consumes oxygen from said container as indicated by the rate of collapse thereof.

5. In an apparatus for determining metabolic rates including means for indicating the rate at which a test subject consumes a major charge of oxygen, said apparatus being characterized by the provision of an electrical computer having means for energizing the same simultaneously with the initiation of the consumption of said oxygen charge by the test subject and for de-energizing said computer simultaneously with the final consumption of the oxygen charge by the test subject, said computer having operatively connected in circuit and mutually cooperating with one another to compute the subject's metabolic rate first and second vacuum tubes each including a cathode, grid and plate, a voltage source connected between the grid of said first tube and ground, a first potentiometer having its winding connected between the cathode of said first tube and ground, the movable contact of said first potentiometer being connected to the grid of said second tube, a second potentiometer having its winding connected between the cathode of said second tube and ground, and a voltage responsive meter connected to respond to variations in the voltage in the movable contact of said second potentiometer as determined both by its own position and the position of said contact arm of said first potentiometer.

6. In an apparatus for separately determining the metabolic rates of test subjects, including means for determining the times required by the respective test subjects to consume a predetermined amount of oxygen gas, said apparatus being characterized by the provision of an electrical analog computer circuit having means for energizing the same simultaneously with the initiation of the consumption of said predetermined amount of oxygen by the test subject and for de-energizing said computer simultaneously with the final consumption of said oxygen by the test subject, said analog computer circuit being of the type in which the variables to be computed are represented by voltages, means for introducing into said analog computer circuit voltages which vary in accordance with the reciprocals of said times required by said test subjects to consume said predetermined amount of oxygen gas, said means comprising a variable resistor adapted to be connected to a source of voltage and having a linear winding and a contact slidingly mounted thereon, a build out resistor connected to said variable resistor, and linear scale means calibrated in units of time for indicating the positions of said sliding contact as related to said times required by said test subjects to consume said predetermined amount of oxygen gas, said scale means being so constructed that the reading thereof when said contact is at a terminal of said winding is a certain number of time units and when said contact is at an intermediate part of said winding is a greater number of time units, and said build out resistor having a resistance equal to the resistance of said variable resistor when set for twice the number of time units as said certain number of time units.

7. In an apparatus for separately determining the metabolic rates of test subjects, including means for determining the times required by the respective test subjects to consume a predetermined amount of oxygen gas, said apparatus being characterized by the provision of an electrical analog computer circuit having means for energizing the same simultaneously with the initiation of the consumption of said predetermined amount of oxygen by the test subject and for de-energizing said computer simultaneously with the final consumption of said oxygen by the test subject, said analog computer circuit being of the type in which the variables to be computed are represented by voltages, means for introducing into said analog computer circuit voltages which vary in accordance with the reciprocals of said times required by said test subjects to consume said predetermined amount of oxygen gas, said means comprising a variable impedance adapted to be connected to a source of voltage and including a movable element, said variable impedance being constructed to insert zero impedance into said analog computer circuit when said movable element is in a first position and an increasing amount of impedance into said analog computer circuit as said movable element is moved away from said first position, a build out impedance connected to said variable impedance, scale means calibrated in units of time for indicating the positions of said movable element as related to said times required by said test subjects to consume said predetermined amount of oxygen gas, said scale means being so constructed that the reading thereof is a certain number of time units when said movable element is in said first position and is an increasing number of time units as said movable element is moved away from said first position, and said build out impedance having a value equal to the value of said variable impedance when the latter is set for a number of time units which is a multiple of said certain number of time units.

8. The invention as claimed in claim 7 characterized in that said computer circuit includes a constant speed motor which is energized during the time required by the respective test subjects to consume said predetermined amount of oxygen gas, and further characterized in the provision of means to connect said motor to said movable element to cause movement of the latter from said first position one unit on said scale means during each corresponding unit of time during which said motor is in operation and after said motor has run for said certain number of time units.

9. In an apparatus for determining metabolic rates, gas container means for measuring the time required by a test subject to consume a predetermined amount of oxygen gas, that improvement which comprises a constant speed motor, means operatively associating said gas container means and said motor to activate the latter for the exact entire time required by said test subject to consume said predetermined amount of oxygen gas, a variable impedance including a movable element, said variable impedance being constructed to have zero impedance when said movable element is in a first position and a linearly increasing amount of impedance as said movable element is moved away from said first position in a given direction, a build out impedance connected to said variable impedance, and means associating said motor and movable element to cause movement of the latter from said first position in said given direction after said motor has run for a predetermined length of time, said variable and build out impedance being constructed to have equal resistances after said motor has run for twice said predetermined length of time.

10. The invention as claimed in claim 9, in which said variable impedance is a rheostat having an arcuate winding with arcuately spaced end terminals, the contact arm of said rheostat being adapted to rotate for a full 360 degrees including the space between said end terminals, in which said build out impedance is a resistor connected in series with said rheostat, and in which said contact arm is initially rotated through said space by said motor and only engages one of said end terminals after said motor has run for said predetermined length of time.

11. In an apparatus for determining the metabolic rate of a test subject, a collapsible gas container connected in a closed circuit with an attachment by which said test subject can inhale from and exhale into said gas container, said closed circuit including means to absorb exhaled carbon dioxide, means for charging said gas container with a first predetermined charge of oxygen gas to cause the same to expand from a predetermined reference condition to an enlarged condition, means for determining the length of time required by said container to return to said reference condition after said test subject commences to consume oxygen therefrom, electrical computer means operable to transform time periods into direct readings of the test subject's metabolic rate simultaneously with the collapse of said oxygen container to predetermined reference conditions, means for activating and deactivating said computer means each time and as the test subject respectively starts and stops consuming oxygen from said container, means for charging said gas container with a second predetermined charge of oxygen gas to thus increase the length of time required by said container to return to said reference condition, and means for altering the voltage input to said computer in accordance with the ratio between said first and second predetermined charges of oxygen gas for the purpose of compensating for said second charge of oxygen.

12. In an apparatus for determining the metabolic rate of a test subject, a collapsible gas container connected in a closed circuit with an attachment by which said test subject can inhale from and exhale into said gas container, said closed circuit including means to absorb exhaled carbon dioxide, means for charging said gas container with a predetermined charge of oxygen gas to cause the same to expand from a predetermined reference condition to an enlarged condition, electrical analog computer means including means for activating and deactivating said computer means simultaneously with the starting and stopping of oxygen consumption by the test subject from said container, means for determining the length of time required by said container to return to said reference condition after said test subject commences to consume oxygen therefrom, and means for connecting the input of said computer means to a source of voltage and its output to a voltage responsive meter, said computer means including a variable impedance having a movable element to be set automatically in accordance with said length of time and to alter the voltage from said voltage source in a manner inversely proportional to said length of time, said variable impedance being connected to a build out impedance and being constructed to have zero impedance when said movable element is in a first position and a linearly increasing amount of impedance as said movable element is moved away from said first position.

13. In an apparatus for determining the metabolic rate of a test subject, a collapsible gas container connected in a closed circuit with an attachment by which said test subject can inhale from and exhale into said gas container, said closed circuit including means to absorb exhaled carbon dioxide, means for charging said gas container with a first predetermined charge of oxygen gas to cause the same to expand from a predetermined collapsed reference condition to an enlarged condition, electrical analog computer means including means for activating and deactivating said computer means simultaneously with the starting and stopping of oxygen consumption by the test subject from said container, means for determining the length of time required by said container to return to said reference condition after said test subject commences to consume oxygen therefrom, means for connecting the input of said analog computer means to a source of voltage and its output to a voltage responsive meter, said computer means including a variable unit adapted to be set in accordance with said length of time and to alter the voltage from said voltage source in a manner inversely proportional to said length of time, said variable unit being inoperative unless said length of time is greater than a predetermined value, means for charging said gas container with a second predetermined charge of oxygen gas when it appears that said test subject will consume said first predetermined charge in less than said predetermined time value, and means for altering the voltage input to said voltage responsive meter in accordance with the ratio between said first and second predetermined charges of oxygen gas for the purpose of compensating for said second charge of oxygen.

14. The invention as claimed in claim 13, in which said first and second predetermined charges are equal to each other, and the last named means comprises a device for doubling the voltage of said voltage source.

15. In an electrical analog computer circuit for computing the metabolic rate of a test subject, a first variable unit adapted to be connected to a source of input voltage and to alter the voltage output therefrom in accordance with the rate at which said test subject consumes oxygen, a second variable unit adapted to be connected to a source of voltage and to alter the voltage output therefrom in accordance with the standard metabolic rate of a person of the same age and sex as said test subject, a voltage responsive meter having a scale calibrated in terms of metabolic rate, and circuit means for connecting alternately said first and second variable units to said meter to produce readings on said scale, said circuit means including impedance means so adjusted that said scale will read alternately the metabolic rate of said test subject and the metabolic rate of a person of the same age and sex as said test subject.

16. An apparatus for indicating the percent deviation between the metabolic rate of a test subject and the standard metabolic rate of a person of the same age and sex as said test subject, which comprises first circuit means adapted to be varied to generate a first voltage representing the metabolic rate of said test subject, second circuit means adapted to be varied to generate a second voltage representing the standard metabolic rate of a person of the same age and sex as said test subject, and meter means connected to said first and second circuit means in such a manner as to be responsive to the difference between said first voltage and said second voltage, said meter means including a voltage responsive meter and a meter impedance means having an impedance value equal to a constant times said second voltage regardless of the standard rate which said second circuit means and second voltage is set to represent.

17. The invention as claimed in claim 16, in which said meter impedance means is connected in series with said meter and comprises an impedance adapted to be varied in accordance with variations in the portion of said second circuit means which determines said second voltage.

18. An apparatus for indicating the percent deviation between the metabolic rate of a test subject and the standard metabolic rate of a person of the same age and sex as said test subject, which comprises computer means to generate a first voltage representing the metabolic rate of said test subject, age-sex circuit means connected to a source of voltage and including first variable impedance means adapted to vary the voltage from said voltage source, said first variable impedance means being calibrated in terms of the standard metabolic rates of persons of various ages and both sexes whereby said first variable impedance means may be set to generate a second voltage representing the standard metabolic rate of a person of the same age and sex as said test subject, a voltage responsive meter connected to the outputs of said computer means and said age-sex circuit means in such a way as to respond to the difference between said first and second voltages, and second variable impedance means connected in series with said meter and coupled to said first variable impedance means for automatic setting therewith, said second variable impedance means having an impedance value equal to a constant times said second voltage regardless of the setting of said first and second variable impedance means.

19. The invention as claimed in claim 18, in which said first variable impedance means comprises a potentiometer the winding of which has a build out resistor connected to each end thereof, and in which said second variable impedance means comprises a rheostat the winding of which has a build out resistor connected thereto, the movable contacts of said potentiometer and rheostat being mechanically coupled to each other for movement together, said elements being so constructed that in the absence of said first voltage said meter will read full scale regardless of the setting of said movable contacts.

20. In an apparatus for determining metabolic rates and including a collapsible gas container charged with oxygen and connected in a closed circuit with an attachment by which a test subject can inhale oxygen from and exhale oxygen into said container, said closed circuit including means to eliminate exhaled carbon dioxide so that said container will collapse as said test subject consumes said oxygen; means to determine the metabolic rate of said test subject and comprising an electrical computer circuit of the analog type connected to a source of voltage, said computer circuit including means for activating and deactivating the same simultaneously with the starting and stopping of oxygen consumption by the test subject from said container, said computer circuit having a variable impedance adapted to be set in accordance with the rate at which said test subject consumes said oxygen from said container as indicated by the rate of collapse thereof, said variable impedance being adapted when thus set to alter the voltage from said voltage source in a manner proportional to said rate of oxygen consumption, an electrical indicating instrument connected in said computer circuit and responsive to the voltage from said voltage source as altered by said variable impedance, an age-sex circuit adapted to generate a voltage representing the standard metabolic rate of a person of the same age and sex as said test subject, said age-sex circuit being connected to said indicating instrument in a manner such that its voltage bucks the voltage from said computer circuit, and means associated with said age-sex circuit and with said indicating instrument operable to indicate the percent deviation between the metabolic rate of said test subject and the standard metabolic rate of a person of the same age and sex as said test subject.

21. In an apparatus for determining the metabolic rate of a test subject, a collapsible gas container charged with oxygen and including means by which said test subject can inhale from and exhale into said container, there being means provided to remove exhaled carbon dioxide from the system so that said container will collapse as said oxygen is consumed, and photoelectric means to indicate when said container is in a predetermined reference condition.

22. The invention as claimed in claim 21, in which said container is a lightweight bellows mounted in dependent relation from a generally horizontal support, said bellows having a vertically movable bottom wall and being entirely unencumbered by switching or bearing means.

23. The invention as claimed in claim 21, in which said photoelectric means comprises an exciter lamp adapted to direct a beam of light past a movable part of said container when not blocked thereby, and a photocell adapted to be excited by said beam of light.

24. In an apparatus for determining the metabolic rate of a test subject, a collapsible gas container charged with oxygen and including means by which said test subject can inhale from and exhale into said container, means to remove exhaled carbon dioxide from the system so that said container will collapse as said oxygen is consumed, means to charge said container with a predetermined amount of oxygen gas to cause expansion thereof from a predetermined reference condition to an enlarged condition, photoelectric means mounted to respond to return of said container to said predetermined reference condition after consumption of said predetermined amount of oxygen gas, and signal means controlled by said photoelectric means for operation after return of said container to said predetermined reference condition.

25. In an apparatus for determining the metabolic rate of a test subject, a collapsible gas container charged with oxygen and including means by which said test subject can inhale froim and exhale into said container, means to remove exhaled carbon dioxide from the system so that said container will collapse as said oxygen is consumed, means to charge said container with a predetermined amount of oxygen gas to cause expansion thereof from a predetermined reference condition to an enlarged condition, photoelectric means mounted to respond to return of said container to said predetermined reference condition after consumption of said predetermined amount of oxygen gas, and a timer adapted to be started when said test subject commences to consume said oxygen gas and operatively associated with said photoelectric means for automatic stopping after return of said container to said predetermined reference condition.

26. The invention as claimed in claim 25, in which time delay means are provided to prevent stopping of operation of said timer until said container has been in said reference condition or in a smaller condition for a predetermined length of time.

27. A breathing reservoir, comprising a support, a bellows mounted on said support and formed of extremely lightweight flexible material impervious to gas, means to charge said bellows with gas, means to conduct said gas in both directions between said bellows and a subject inhaling and exhaling said gas, and photoelectric means to indicate when said bellows is in a predetermined condition.

28. The invention as claimed in claim 27, in which said bellows is mounted in dependent relation from said support.

29. A gas unit for an apparatus for determining metabolic rates, which comprises a horizontal support plate, a bellows mounted in dependent relation from said horizontal support plate and having a vertically movable bottom wall, said bellows being formed entirely of lightweight flexible material and being free of attachments such as bearing and switch elements, a gas tight canister mounted in dependent relation from said support plate, said canister being substantially filled with a gas pervious granular substance which will absorb carbon dioxide, a first conduit extending between said bellows and the upper portion of said canister, and a second conduit extending between the upper portion of said canister and a face mask adapted to be mounted on a test subject, said first and second conduits being so arranged relative to said canister that gas flowing between said subject and bellows will follow a curved path through said absorbent substance, said conduits, canister, bellows and face mask being characterized by the absence of one way valve means.

30. The invention as claimed in claim 29, in which photoelectric means are provided to indicate when said bottom bellows wall is at a predetermined elevation.

31. In an apparatus for determining metabolic rates and including a collapsible gas container charged with oxygen and connected in a closed circuit with an attachment by which a test subject can inhale oxygen from and exhale oxygen into said container, said closed circuit including means to eliminate exhaled carbon dioxide so that said container will collapse as said test subject consumes said oxygen; means to determine the metabolic rate of said test subject and comprising an electrical computer circuit of the analog type connected to a source of voltage, means for activating and deactivating said computer circuit simultaneously with the starting and stopping of oxygen consumption by the test subject from said collapsible gas container, said circuit including a plurality of cascaded variable impedances each adapted to be set in accordance with the factor in the test subject's metabolic rate which it represents, and when thus set to alter the voltage from said voltage source as a function of the factor represented, means connected in said circuit between the respective variable impedances to prevent loading error and interaction therebetween, and a voltage responsive meter connected to the output of said circuit for response to the voltage from said voltage source as altered by said variable impedances.

32. In metabolic rate measuring apparatus of the type having means for supplying a test subject with a predetermined weight of oxygen and including means for absorbing carbon dioxide and water vapor from exhalant of the test subject and additionally including means for measuring the time required for the consumption of said predetermined weight of oxygen; that improvement which comprises electrical analog computer means for converting a plurality of metabolic rate determining factors peculiar to a specific test subject and including the time required for that test subject to consume said oxygen into a value indicative of that subject's metabolic rate, said computer having an electrical circuit adapted to be energized from a constant voltage source, said circuit including a plurality of variable impedance elements each manually settable to positions representative of different metabolic rate factors peculiar to the test subject and a separate variable impedance element adjustable to a position to generate a voltage inversely proportional to the time required by the test subject to consume said predetermined quantity of oxygen, and metabolic rate indicating means connected in said circuit with all of said impedance elements and responsive to the combined effects thereof to indicate the metabolic rate of the test subject.

33. A metabolic rate measuring apparatus as defined in claim 32 characterized in that said apparatus is adapted to be connected to and energized by a conventional A.C. power source, said rate indicating means for reading out a test subject's metabolic rate being adapted to be energized by a D.C. input voltage, and means between said A.C. input and said rate indicating means for converting A.C. to D.C.

34. A metabolic rate measuring apparatus as defined in claim 33 characterized in that at least one scale of said rate indicating means is calibrated to represent metabolic rate in terms of percent deviation from the metabolic rate of a normal person of the same age and sex as the test subject.

References Cited in the file of this patent

UNITED STATES PATENTS

| | | |
|---|---|---|
| 1,955,315 | Styer | Apr. 17, 1934 |
| 2,090,358 | Reiter | Aug. 17, 1937 |
| 2,204,295 | Brockman | June 11, 1940 |
| 2,221,482 | Jones | Nov. 12, 1940 |
| 2,483,138 | Helmer | Sept. 27, 1949 |
| 2,557,070 | Berry | June 19, 1951 |
| 2,692,497 | Van Nordstrand | Oct. 26, 1954 |
| 2,707,947 | Traugott | May 10, 1955 |
| 2,792,828 | Engelder | May 21, 1957 |

OTHER REFERENCES

Electronic Analog Computers, Korn, pages 7, 131, 230, 233, 252, 254, 346, 347; pub. 1952 by McGraw-Hill Book Co., New York. (Copy in Division 68.)